(12) United States Patent
Kang et al.

(10) Patent No.: US 11,231,754 B2
(45) Date of Patent: Jan. 25, 2022

(54) HINGE STRUCTURE AND ELECTRONIC DEVICE INCLUDING THE SAME

(71) Applicant: Samsung Electronics Co., Ltd., Suwon-si (KR)

(72) Inventors: Jaeho Kang, Suwon-si (KR); Minsung Lee, Suwon-si (KR); Seunghyun Hwang, Suwon-si (KR); Chungkeun Yoo, Suwon-si (KR); Jungjin Kim, Suwon-si (KR); Jongyoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/079,327

(22) Filed: Oct. 23, 2020

(65) Prior Publication Data

US 2021/0041921 A1 Feb. 11, 2021

Related U.S. Application Data

(63) Continuation of application No. 16/862,891, filed on Apr. 30, 2020, now Pat. No. 10,845,850.

(30) Foreign Application Priority Data

Apr. 30, 2019 (KR) .................. 10-2019-0050282

(51) Int. Cl.
*G06F 1/16* (2006.01)
*E05D 3/12* (2006.01)
*H04M 1/02* (2006.01)

(52) U.S. Cl.
CPC ........... *G06F 1/1681* (2013.01); *E05D 3/122* (2013.01); *G06F 1/1616* (2013.01); *G06F 1/1652* (2013.01); *H04M 1/022* (2013.01)

(58) Field of Classification Search
CPC .... G06F 1/1681; G06F 1/1652; G06F 1/1616; E05D 3/122; H04M 1/022
See application file for complete search history.

(56) References Cited

U.S. PATENT DOCUMENTS 9,535,452 B2 1/2017 Ahn
9,677,308 B1 6/2017 Chen et al.
(Continued)

FOREIGN PATENT DOCUMENTS

CN 207018340 U 2/2018
CN 207399686 U 5/2018
(Continued)

OTHER PUBLICATIONS

Notification of Transmittal of the International Search Report and the Written Opinion of the International Searching Authority, or the Declaration dated Aug. 21, 2020 in connection with International Patent Application No. PCT/KR2020/005458, 9 pages.
(Continued)

*Primary Examiner* — Nidhi Thaker

(57) ABSTRACT

A hinge structure includes a first rotary bracket that rotates about a first virtual axis and a second rotary bracket that rotates about a second virtual axis The hinge structure also includes a fixed bracket that includes the first rotary bracket and the second rotary bracket fixed thereto. The hinge further structure includes a first rotary member, a second rotary member, a first arm and a second arm. Additionally, the hinge structure includes a cam part that includes bumpy structures. A first elastic body is mounted on the first rotary member and supports at least one side of the cam part and second elastic body is mounted on the second rotary member and supports at least an opposite side of the cam part. The hinge structure also includes a support bracket that supports the first elastic body and the second elastic body.

22 Claims, 16 Drawing Sheets

(56) References Cited

U.S. PATENT DOCUMENTS

| | | | |
|---|---|---|---|
| 9,759,242 B2 | 9/2017 | Hsu | |
| 9,848,502 B1* | 12/2017 | Chu | E05D 11/1078 |
| 9,915,086 B2 | 3/2018 | Kato | |
| 9,921,613 B2 | 3/2018 | Kuramochi | |
| 10,036,188 B1* | 7/2018 | Yao | H05K 5/0226 |
| 10,303,223 B2 | 5/2019 | Park et al. | |
| 10,480,225 B1* | 11/2019 | Hsu | E05D 3/12 |
| 10,754,377 B2 | 8/2020 | Siddiqui | |
| 10,761,573 B2 | 9/2020 | Hsu | |
| 2010/0041448 A1* | 2/2010 | Gaddy | G06F 1/1616 |
| | | | 455/575.3 |
| 2015/0013107 A1* | 1/2015 | Shin | E05D 3/06 |
| | | | 16/366 |
| 2015/0366089 A1* | 12/2015 | Park | G06F 1/1641 |
| | | | 361/679.01 |
| 2016/0097227 A1 | 4/2016 | Hsu | |
| 2016/0295709 A1 | 10/2016 | Ahn | |
| 2017/0328102 A1 | 11/2017 | Kato | |
| 2017/0351303 A1 | 12/2017 | Kuramochi | |
| 2018/0024596 A1 | 1/2018 | Park et al. | |
| 2018/0066465 A1* | 3/2018 | Tazbaz | G06F 1/1681 |
| 2018/0164855 A1* | 6/2018 | Tazbaz | G06F 1/1641 |
| 2018/0292860 A1 | 10/2018 | Siddiqui | |
| 2018/0363341 A1* | 12/2018 | Siddiqui | H04M 1/022 |
| 2020/0103935 A1 | 4/2020 | Hsu | |

FOREIGN PATENT DOCUMENTS

| | | |
|---|---|---|
| CN | 109469680 A | 3/2019 |
| KR | 10-2013-0073331 A | 7/2013 |
| KR | 10-1574534 B1 | 12/2015 |
| WO | 2017/142258 A2 | 8/2017 |

OTHER PUBLICATIONS

European Search Report dated Aug. 17, 2020 in connection with European Patent Application No. 20 17 2488, 7 pages.

Office Action dated Oct. 27, 2021 in connection with Chinese Patent Application No. 202110692885.6, 24 pages.

Notice of Preliminary Examination Result dated Oct. 5, 2021 in connection with Korean Patent Application No. 10-2019-0050282, 5 pages.

* cited by examiner

HINGE STRUCTURE AND ELECTRONIC DEVICE INCLUDING THE SAME

CROSS-REFERENCE TO RELATED APPLICATION

This application is a continuation of U.S. patent application Ser. No. 16/862,891 filed on Apr. 30, 2020, which is based on and claims priority under 35 U.S.C. § 119 to Korean Patent Application No. 10-2019-0050282 filed on Apr. 30, 2019 in the Korean Intellectual Property Office, the disclosures of which are herein incorporated by reference in their entirety.

BACKGROUND

1. Field

The disclosure relates to an electronic device including a hinge structure.

2. Description of Related Art

A portable electronic device such as a smartphone may provide various functions, such as telephone call, video playback, Internet search, and the like, based on various types of applications. A user may want to use the aforementioned various functions through a wider screen. However, portability may be decreased with an increase in screen size. Accordingly, a foldable portable electronic device capable of increasing portability using a foldable structure has been developed.

The above information is presented as background information only to assist with an understanding of the disclosure. No determination has been made, and no assertion is made, as to whether any of the above might be applicable as prior art with regard to the disclosure.

SUMMARY

In the foldable electronic device, a hinge structure may be connected with housing structures adjacent thereto, and during rotation of the housing structures through a predetermined angle, the hinge structure may perform rotary motion while supporting the housing structures. Various structures need to be disposed to support hinge motions of the housing structures. However, the foldable electronic device having a relatively narrow folding area has a small space for an arrangement of the various structures, and therefore it is difficult to arrange the various structures for supporting the hinge motions.

Aspects of the disclosure are to address at least the above-mentioned problems and/or disadvantages and to provide at least the advantages described below. Accordingly, an aspect of the disclosure is to provide a hinge structure for optimizing an arrangement of structures related to hinge motion, and an electronic device including the hinge structure.

Another aspect of the disclosure is to provide a hinge structure having various functions related to hinge motion, and an electronic device including the hinge structure.

In accordance with an aspect of the disclosure, a hinge structure includes a first rotary bracket that rotates about a first virtual axis within a first range, a second rotary bracket that rotates about a second virtual axis within a second range, a fixed bracket having the first rotary bracket and the second rotary bracket fixed thereto, a first rotary member that rotates about a first axis of rotation different from the first virtual axis, a second rotary member that rotates about a second axis of rotation different from the second virtual axis, a first arm including a first basic body, a first connecting part disposed on one side of the first basic body and connected with the first rotary bracket, a first insertion part having one side mounted on the first rotary member, and a first rotary cam disposed adjacent to the first insertion part, a second arm including a second basic body, a second connecting part disposed on one side of the second basic body and connected with the second rotary bracket, a second insertion part having one side mounted on the second rotary member, and a second rotary cam disposed adjacent to the second insertion part, a cam part having bumpy structures corresponding to the first rotary cam and the second rotary cam, a first elastic body that is mounted on the first rotary member and that supports at least one side of the cam part in a direction toward the first arm, a second elastic body that is mounted on the second rotary member and that supports at least an opposite side of the cam part in a direction toward the second arm, and a support bracket that supports the first elastic body and the second elastic body.

In accordance with another aspect of the disclosure, an electronic device includes a first housing, a second housing, a hinge structure that connects the first housing and the second housing and supports hinge motion of the first housing or the second housing, a hinge housing that surrounds the hinge structure, and a flexible display disposed on the first housing and the second housing. At least part of the flexible display is attached to at least part of an upper side of the first housing or an upper side of the second housing, and at least part of a central portion of the flexible display is disposed to have a specified gap from the hinge structure. The hinge structure includes a first rotary bracket that is coupled with the first housing and that rotates about a first virtual axis within a first range, a second rotary bracket that is coupled with the second housing and that rotates about a second virtual axis within a second range, a fixed bracket having the first rotary bracket and the second rotary bracket fixed thereto, a first arm that is connected with the first rotary bracket on one side thereof and that has a first rotary cam formed on an opposite side thereof, a second arm that is connected with the second rotary bracket on one side thereof and that has a second rotary cam formed on an opposite side thereof, and a cam part having bumpy structures corresponding to the first rotary cam and the second rotary cam.

In accordance with another aspect of the disclosure, an electronic device includes a first rotary member that rotates about a first axis, a second rotary member that rotates about a second axis, a first arm having a first connecting part, a second connecting part, and a first cam structure, the first connecting part being connected with the first rotary member, and the second connecting part being connected with the second rotary member, a second arm having a third connecting part, a fourth connecting part, and a second cam structure, a cam member including a first cam engaged with the first cam structure and a second cam engaged with the second cam structure, a first elastic body that is connected with the first rotary member and that applies elastic force to the cam member, a second elastic body that is connected with the second rotary member and that applies elastic force to the cam member, a first rotary bracket having a first slide hole and a first rail, a second rotary bracket having a second slide hole and a second rail, and a fixed bracket having a first guide groove corresponding to the first rail and a second guide groove corresponding to the second rail. The first slide hole of the first rotary bracket and the second connecting part are connected through a first fixing part, and the second slide hole of the second rotary bracket and the fourth connecting part are connected through a second fixing part. The first fixing part slides in the first slide hole to correspond to rotation of the first arm, and the second fixing part slides in the second slide hole to correspond to rotation of the second arm. The first rotary bracket rotates about a third axis, and the second rotary bracket rotates about a fourth axis.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
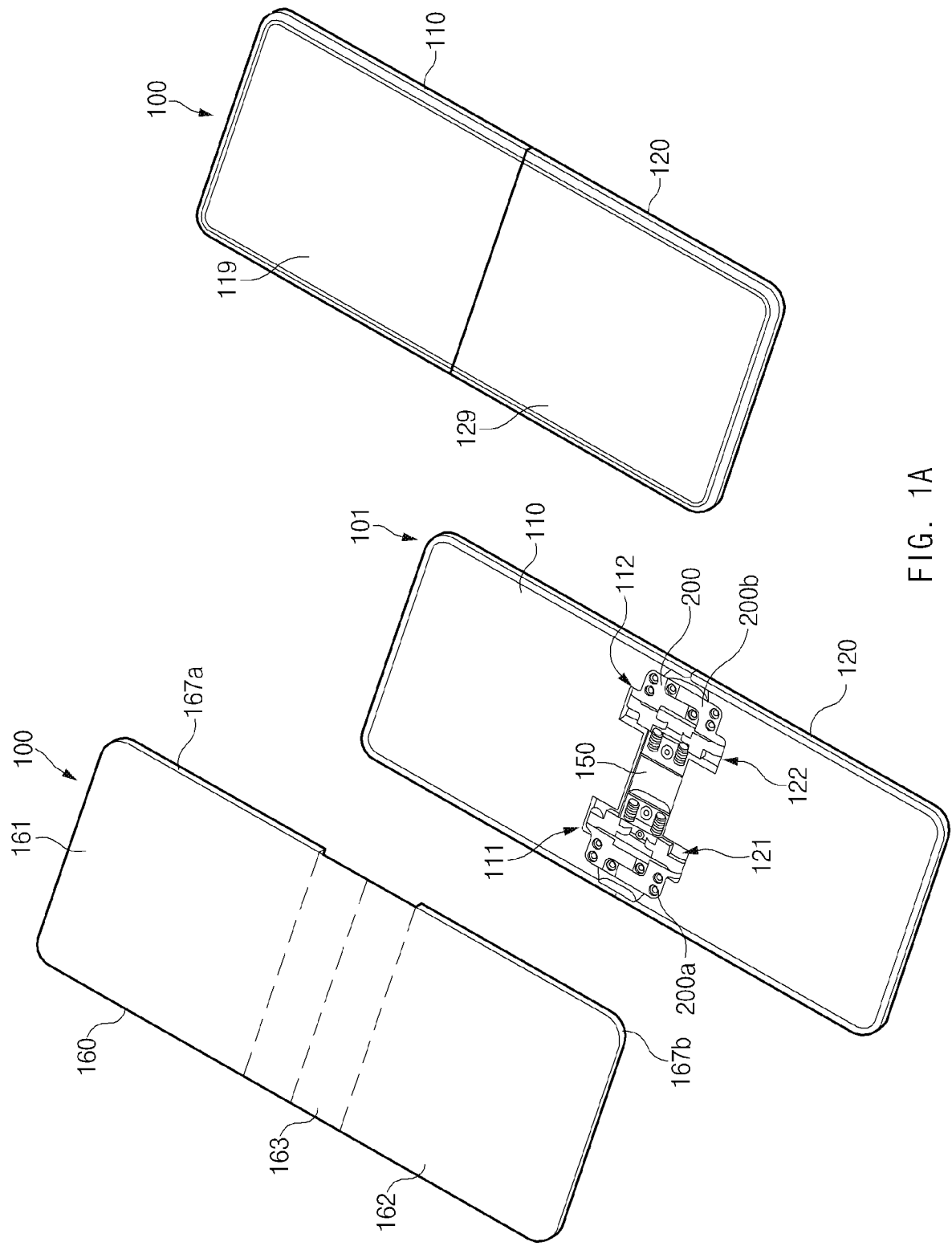
FIG. 1A illustrates a perspective view of an electronic device in a first state according to various embodiments.

FIGS. 1A through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modifications, equivalents, and/or alternatives on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

Figure 1B:
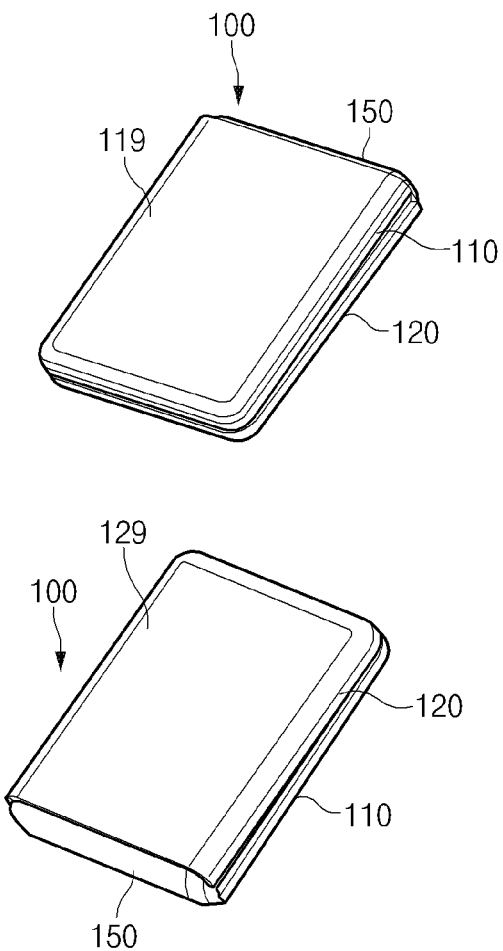
FIG. 1B illustrates a view of one example of the exterior of the electronic device in a second state according to various embodiments.

FIG. 1A illustrates a perspective view of an electronic device in a first state according to various embodiments, and FIG. 1B illustrates a view of one example of the exterior of the electronic device in a second state according to various embodiments.

Referring to FIGS. 1A and 1B, the electronic device 100 (or the foldable electronic device) according to an embodiment may include a housing 101 including a first housing 110 and a second housing 120, a display 160 (e.g., a flexible display), and a hinge housing 150 having hinge structures 200 disposed on the inside thereof. FIG. 1A illustrates a perspective view of the electronic device 100 in the first state (e.g., a flat state or an unfolded state), and FIG. 1B is a perspective view of the electronic device 100 in the second state (e.g., a folded state). Additionally or alternatively, the electronic device 100 may further include a first cover 119 that covers a rear side of the first housing 110 and a second cover 129 that covers a rear side of the second housing 120.

According to various embodiments, depending on an arrangement, the first housing 110 may be disposed to be continuous with the second housing 120 (e.g., when a central portion 163 of the display 160 is unfolded to be flat or when the housing 101 is in a flat state), or may be disposed side by side with the second housing 120. Alternatively, when the central portion 163 of the display 160 is folded, one side of the first housing 110 may be disposed to face one side of the second housing 120.

For example, at least part of the first housing 110 may be formed of a metallic material, or at least part of the first housing 110 may be formed of a non-metallic material. For example, the first housing 110 may be formed of a material having a predetermined stiffness to support at least part of the display 160. One area of the display 160 (e.g., an upper portion 161 of the display 160 and part of the central portion 163 thereof) may be disposed on at least part of a front side of the first housing 110. At least part of the first housing 110 may be bonded with the upper portion 161 of the display 160. Alternatively, at least part of a periphery of the front side of the first housing 110 may be bonded with a periphery of the upper portion 161 of the display 160. In another case, one side of an upper portion of the front side of the first housing 110 may be bonded with one side of the upper portion 161 of the display 160. In this regard, a first adhesive layer 167a may be disposed in at least a partial area between the first housing 110 and the upper portion 161 of the display 160. The first housing 110 may have an empty space therein, or may be coupled with the first cover 119 to form an empty space inside. Electronic components (e.g., a printed circuit board, and components, such as at least one processor, at least one memory, and a battery, which are mounted on the printed circuit board) that are used to drive the display 160 may be disposed in the empty space.

According to various embodiments, edges of the first housing 110 (e.g., the remaining three edges other than the edge facing the second housing 120) may protrude above a bottom surface of a central portion of the first housing 110 by a specified height to surround at least one edge of the display 160. Alternatively, a sidewall may be disposed on at least one of the edges of the first housing 110 to face at least one edge of the display 160. For example, sidewalls may be formed on the remaining three edges of the first housing 110 other than the edge facing the second housing 120 to have a specified height. The edge portion of the first housing 110 that faces the second housing 120 may include a depression, at least part of which has a predetermined curvature such that at least part of the hinge housing 150 is disposed therein. For example, the first housing 110 may include, on the edge portion facing the second housing 120, a first step 111 in which to receive part of the hinge housing 150 on which a first hinge structure 200a is mounted and a second step 112 in which to receive part of the hinge housing 150 on which a second hinge structure 200b is mounted.

According to various embodiments, depending on an arrangement, the second housing 120 may be disposed side by side with the first housing 110, or may be disposed such that at least one side faces one side of the first housing 110 (e.g., the side on which the display 160 is disposed). The second housing 120 may be formed of the same material as that of the first housing 110. The second housing 120 may be disposed to be horizontally or vertically symmetric to the first housing 110, and the remaining area of the display 160 (e.g., a lower portion 162 of the display 160 and an opposite side of the central portion 163 thereof) other than the area disposed on the first housing 110 may be disposed on a front side of the second housing 120. At least part of the second housing 120 may be bonded with the lower portion 162 of the display 160. Alternatively, a periphery of the front side of the second housing 120 may be bonded with a periphery of the lower portion 162 of the display 160. In another case, one side of a lower portion of the front side of the second housing 120 may be bonded with one side of the lower portion 162 of the display 160. In this regard, a second adhesive layer 167b may be disposed in at least a partial area between the second housing 120 and the lower portion 162 of the display 160. Similarly to the first housing 110, the second housing 120 may have an empty space therein, or may be coupled with the second cover 129 to form an empty space. Electronic components used to drive the display 160 may be disposed in the empty space.

According to various embodiments, edges of the second housing 120 (e.g., the remaining three edges other than the edge facing the first housing 110) may protrude above a bottom surface of a central portion of the second housing 120 by a specified height to surround an opposite edge of the display 160. Alternatively, similarly to the sidewalls formed on the first housing 110, a sidewall may be disposed on at least one of the edges of the second housing 120 to face at least one edge of the display 160. For example, sidewalls may be formed on the remaining three edges of the second housing 120 other than the edge facing the first housing 110 to have a specified height.

The edge portion of the second housing 120 that faces the first housing 110 may include a depression, at least part of which has a predetermined curvature such that at least part of the hinge housing 150 is disposed therein. For example, the second housing 120 may include, on the edge portion facing the first housing 110, a third step 121 in which to receive part of the hinge housing 150 on which the first hinge structure 200a is mounted and a fourth step 122 in which to receive part of the hinge housing 150 on which the second hinge structure 200b is mounted.

According to various embodiments, the electronic device 100 may include at least one sensor disposed on one side of the first housing 110 or the second housing 120 and related to operation of a specific function of the electronic device 100. The sensor may include, for example, at least one of a proximity sensor, an illuminance sensor, an iris sensor, an image sensor (or a camera), or a fingerprint sensor.

According to various embodiments, depending on a folded or flat state of the electronic device 100, the hinge housing 150 may be hidden by one side of the first housing 110 and one side of the second housing 120 (e.g., in a flat state of the housing 101), or may be exposed to the outside (e.g., in a folded state of the housing 101). For example, as illustrated in FIG. 1A, when the first housing 110 and the second housing 120 are disposed side by side, the hinge housing 150 may be hidden by the first housing 110 and the second housing 120. As illustrated in FIG. 1B, when one side of the first housing 110 and one side of the second housing 120 face each other, at least part of the hinge housing 150 may be exposed to the outside from between one edge of the first housing 110 and one edge of the second housing 120 (e.g., the edges of the first housing 110 and the second housing 120 that face each other in a flat state).

According to various embodiments, at least part of the display 160 may be flexible. According to an embodiment, the display 160 may include the upper portion 161 or the first area that is disposed on the first housing 110, the lower portion 162 or the second area that is disposed on the second housing 120, and the central portion 163 or the central area to which the first housing 110 and the second housing 120 are adjacent. According to various embodiments, the entirety of the display 160 may have flexibility. Alternatively, at least part of the central portion 163 of the display 160 may be flexible. The central portion 163 of the display 160 may be disposed such that the first housing 110 and the second housing 120 are not bonded thereto. For example, the central portion 163 of the display 160 may be disposed to be spaced apart from the front sides of the first housing 110 and the second housing 120 at a predetermined interval. The upper portion 161 of the display 160 may be bonded with at least part of the first housing 110, and the lower portion 162 of the display 160 may be bonded with at least part of the second housing 120. In this regard, the first adhesive layer 167a may be disposed in at least a partial area between the display 160 and the first housing 110, and the second adhesive layer 167b may be disposed in at least a partial area between the display 160 and the second housing 120. The first adhesive layer 167a and the second adhesive layer 167b may be disposed on only the peripheries of the first housing 110 and the second housing 120.

Figure 2:
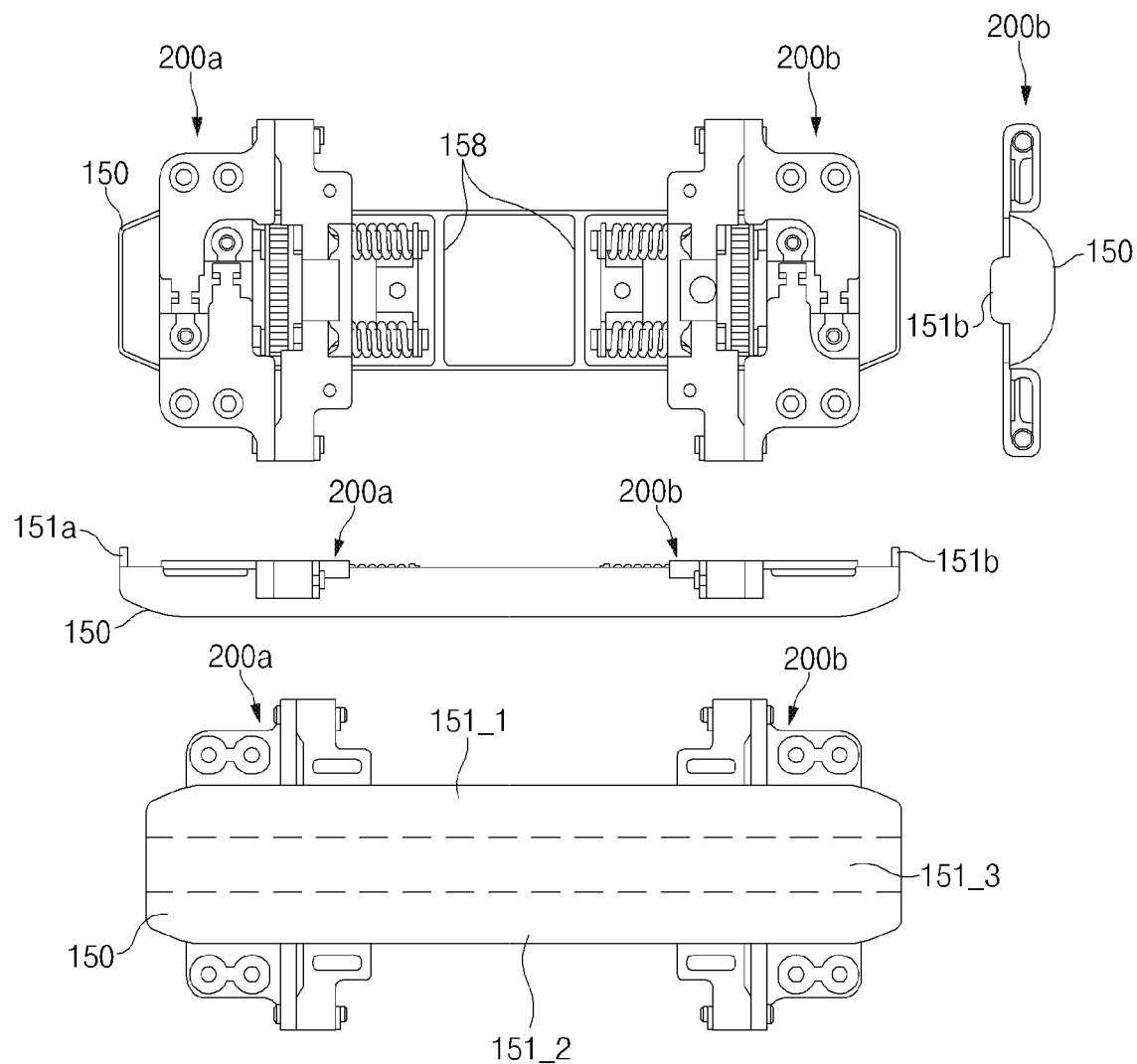
FIG. 2 illustrates a view of one example of hinge structures and a hinge housing of the electronic device according to various embodiments.

FIG. 2 illustrates a view of one example of the hinge structures and the hinge housing of the electronic device according to various embodiments.

Referring to FIG. 2, according to an embodiment, the electronic device 100 may include a plurality of hinge structures. FIG. 2 illustrates a state in which the first hinge structure 200a and the second hinge structure 200b are disposed on the hinge housing 150. However, the disclosure is not limited thereto, and three or more hinge structures may be disposed on the hinge housing 150 as needed.

The first hinge structure 200a may be disposed on one side of the hinge housing 150 (e.g., on a left side with respect to the illustrated drawing). The first hinge structure 200a may be coupled with a left side of the first housing 110a and a left side of the second housing 120 and may rotate about a horizontal axis of the hinge housing 150 within a specified range. The first hinge structure 200a may be disposed to be symmetric to the second hinge structure 200b with respect to a central portion of the hinge housing 150.

The second hinge structure 200b may be disposed on an opposite side of the hinge housing 150 (e.g., on a right side with respect to the illustrated drawing). The second hinge structure 200b may be coupled with a right side of the first housing 110a and a right side of the second housing 120 and may rotate about the horizontal axis of the hinge housing 150 within the specified range. The second hinge structure 200b may be disposed to be symmetric to the first hinge structure 200a with respect to the central portion of the hinge housing 150. The second hinge structure 200b may include the same structure and configuration as the first hinge structure 200a. However, the second hinge structure 200b may differ in position from the first hinge structure 200a.

The hinge housing 150 may have a semi-cylindrical shape with an empty space inside, or may have the shape of a longitudinal half of a pipe with opposite ends closed. According to various embodiments, the hinge housing 150 may include a flat bottom portion 151_3, and a first rib 151_1 and a second rib 151_2 that are formed on opposite sides of the bottom portion 151_3 and that have a predetermined curvature. The first rib 151_1 and the second rib 151_2 may be symmetrically disposed on the opposite sides of the bottom portion 151_3. The hinge housing 150 may have a gradually decreasing width toward the left and right sides from the central portion thereof with respect to the illustrated drawing. The hinge housing 150 may have at least one partition wall 158 formed therein, and the at least one partition wall 158 may divide an interior space of the hinge housing 150 into spaces. At least part of the first hinge structure 200a and at least part of the second hinge structure 200b may be mounted in the spaces divided from each other. The hinge housing 150 may have screen walls 151a and 151b formed at left and right ends thereof. Each of the screen walls 151a and 151b may further protrude upward beyond a peripheral portion to prevent the inside of the hinge housing 150 from being visible from the outside. The hinge housing 150 may be formed of the same material as that of the first hinge structure 200a or the second hinge structure 200b.

Figure 3:
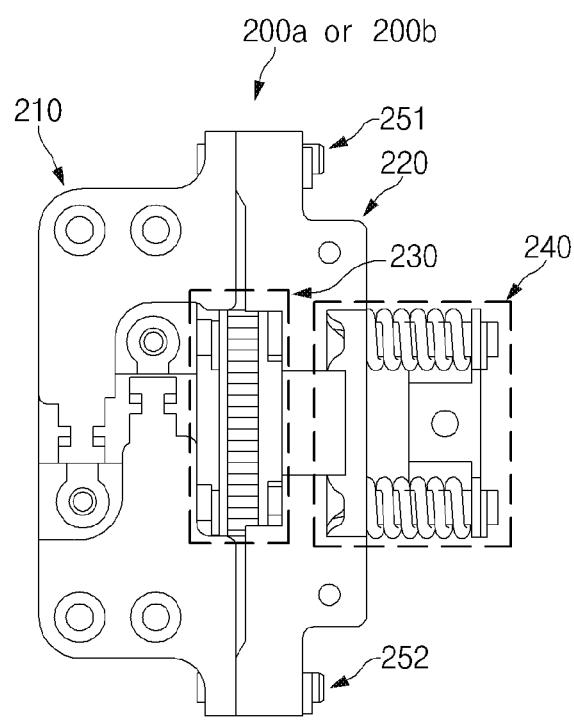
FIG. 3 illustrates a view of one side of a hinge structure applied to the electronic device according to various embodiments.

FIG. 3 illustrates a view of one side of a hinge structure applied to the electronic device according to various embodiments.

Referring to FIG. 3, the hinge structure 200a or 200b may be any one of the first hinge structure 200a and the second hinge structure 200b described above. The hinge structure 200a or 200b may include a bracket structure 210, an arm detent structure 220, a gear structure 230, and a detent support structure 240.

A central portion of the bracket structure 210 may be fixed to the hinge housing 150, and opposite wings (e.g., rotary brackets) of the bracket structure 210 may be coupled with the arm detent structure 220 while being coupled to the first housing 110 and the second housing 120.

One side of the arm detent structure 220 may be connected with the bracket structure 210 through fixing parts 251 and 252, and a mounting angle may be changed as the arm detent structure 220 slides along a lateral portion of the bracket structure 210 depending on hinge motion. The arm detent structure 220 may include a cam structure, and the cam structure may be engaged with a cam part 241 disposed in the detent support structure 240 and may provide a feeling of detent during hinge motions of the first housing 110 and the second housing 120.

The gear structure 230 may be disposed between the bracket structure 210 and the arm detent structure 220. The gear structure 230 may transmit force to allow the second housing 120 to rotate together when the first housing 110 rotates. In this regard, the gear structure 230 may include a plurality of shaft gears and idle gears.

The detent support structure 240 may be fixed to the inside of the hinge housing 150 and may provide specified pressure to the arm detent structure 220. In this regard, the detent support structure 240 may include at least one elastic body and may push the cam part 241 toward the arm detent structure 220 based on the elastic force of the elastic body, and the cam part 241 may support cam operation while being engaged with a rotary cam structure of the arm detent structure 220.

As described above, the hinge structure 200a or 200b according to the embodiment may include the bracket structure 210 that is coupled with the hinge housing 150 and the housings 110 and 120 and that supports folding or unfolding of the display 160 placed thereon, the arm detent structure 220 that is connected to the bracket structure 210 and that provides a feeling of detent, the gear structure 230 that supports simultaneous operation of the first housing 110 and the second housing 120, and the detent support structure 240 that supports the arm detent structure 220 and to which shafts of the gear structure 230 are fixed. The hinge structure 200a or 200b may implement folding or unfolding of the display 160 by rotating about virtual axes formed above the surface of the bracket structure 210. The hinge structure 200a or 200b may provide a feeling of detent based on the cam structure and may support simultaneous hinge motions of the housings 110 and 120 based on the gear structure 230 to suppress torsion of the housings 110 and 120. Furthermore, the hinge structure 200a or 200b may not only support a flat state or a folded state of the housings 110 and 120, but may also support a mounting state at a specified angle, for example, 30 degrees or 60 degrees (e.g., the angle between the front side of the first housing 110 and the front side of the second housing 120).

Figure 4:
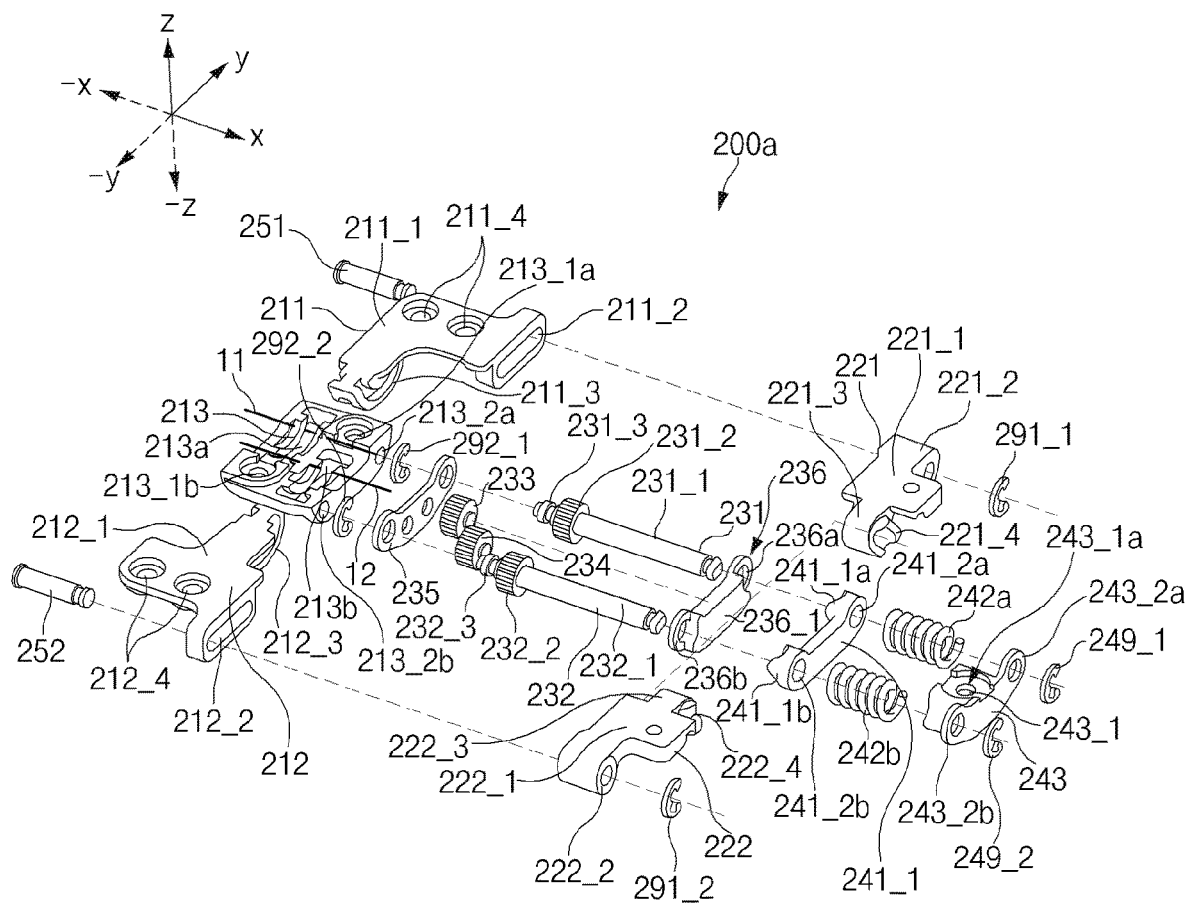
FIG. 4 illustrates an exploded perspective view of the hinge structure of FIG. 3.

FIG. 4 illustrates an exploded perspective view of the hinge structure of FIG. 3.

In the following description, the first hinge structure of the hinge structures 200a and 200b will be described as an example. The first hinge structure 200a, which will be described below with reference to FIG. 4, may have the same structure and configuration as the second hinge structure 200b described above.

Referring to FIG. 4, the first hinge structure 200a may include a fixed bracket 213, a first rotary bracket 211, a second rotary bracket 212, the first fixing part 251, the second fixing part 252, a first arm 221, a second arm 222, a first rotary member 231 rotating about a first axis of rotation that is different from a first virtual axis 11, a second rotary member 232 rotating about a second axis of rotation that is different from a second virtual axis 12, a stopper 236, the cam part 241, a first elastic body 242a, a second elastic body 242b, a support bracket 243, a first idle gear 233, a second idle gear 234, a support plate 235, and a plurality of fixing clips 291_1, 291_2, 292_1, 292_2, 249_1, and 249_2. At least a part of the aforementioned components of the first hinge structure 200a may be formed of a metallic material to have a predetermined stiffness. Alternatively, the first hinge structure 200a may be formed of a material, such as reinforced plastic, resin, or the like, as needed.

At least part of the shape of a lower surface (e.g., a surface facing the −z-axis direction) of the fixed bracket 213 may include a curved surface. For example, the lower surface of the fixed bracket 213 may be formed to correspond to the shape of the inside of the hinge housing 150. An upper surface (e.g., a surface facing the z-axis direction) of the fixed bracket 213 may have a flat shape, and rails grooves 213a and 213b to which the rotary brackets 211 and 212 are coupled may be formed on the upper surface of the fixed bracket 213. According to an embodiment, the fixed bracket 213 may have a cross-section, at least part of which is formed in an arc shape in the direction from the upper surface (e.g., the surface facing the z-axis direction) to the lower surface (e.g., the surface facing the −z-axis direction), and the fixed bracket 213 may include the first rail groove 213a into which a first rail 211_3 of the first rotary bracket 211 is inserted in a second direction (e.g., the −y-axis direction) from a first direction (e.g., the y-axis direction). According to an embodiment, the fixed bracket 213 may have a cross-section, at least part of which is formed in an arc shape in the direction from the upper surface (e.g., the surface facing the z-axis direction) to the lower surface (e.g., the surface facing the −z-axis direction), and the fixed bracket 213 may include the second rail groove 213b into which a second rail 212_3 of the second rotary bracket 212 is inserted in the first direction (e.g., the y-axis direction) from the second direction (e.g., the −y-axis direction). The first rail groove 213a may be disposed to be biased in the y-axis direction, compared to the second rail groove 213b. The second rail groove 213b may be disposed to be biased in the −y-axis direction, compared to the first rail groove 213a. The first rail groove 213a may rotate about the first virtual axis 11, and the second rail groove 213b may rotate about the second virtual axis 12. The first virtual axis 11 and the second virtual axis 12 may be formed in the air above the upper surface (e.g., the surface facing the z-axis direction) of the fixed bracket 213. The first virtual axis 11 and the second virtual axis 12 may be formed to be spaced apart from each other at a specified interval. According to an embodiment, the fixed bracket 213 may include a first mounting recess 213_2a and a second mounting recess 213_2b that are formed on a lateral portion of the fixed bracket 213 that is disposed in a third direction (e.g., the x-axis direction). One end of the first rotary member 231 (e.g., at least part of a first mounting part 231_3) may be mounted in the first mounting recess 213_2a, and one end of the second rotary member 232 (e.g., at least part of a second mounting part 232_3) may be mounted in the second mounting recess 213_2b.

According to various embodiments, the fixed bracket 213 may include a first fixing hole 213_1a and a second fixing hole 213_1b that are used to fix the fixed bracket 213 to the hinge housing 150. In the electronic device 100, the fixed bracket 213 may be fixed to the hinge housing 150 by using coupling members (e.g., screws or the like). According to an embodiment, the first fixing hole 213_1a and the second fixing hole 213_1b may be symmetrically disposed on the upper surface (e.g., the surface facing the z-axis direction) of the fixed bracket 213 in a diagonal direction to more firmly and stably fix the fixed bracket 213 to the hinge housing 150.

The first rotary bracket 211 may include a first bracket body 211_1, a first slide hole 211_2 formed at one end (e.g., an end facing the x-axis direction) of the first bracket body 211_1, the first rail 211_3 formed at an opposite end (e.g., an end facing the −y-axis direction) of the first bracket body 211_1, and first housing coupling holes 211_4 used to couple the first rotary bracket 211 with the first housing 110.

The first bracket body 211_1 may be formed in an overall "L" shape. An upper surface (e.g., a surface disposed to face the z-axis direction) of the first bracket body 211_1 may be formed to be flat. With respect to the illustrated drawing, the first slide hole 211_2 may be disposed at a right end (e.g., an end facing the x-axis direction) of the first bracket body 211_1 in a lower direction (e.g., the −z-axis direction), and the first rail 211_3 may be disposed on a lower surface (e.g., a surface facing the −z-axis direction) at the opposite end (e.g., the end facing the −y-axis direction) of the first bracket body 211_1.

The first slide hole 211_2 may be disposed at the one end (e.g., the end facing the x-axis direction) of the first bracket body 211_1 and may be disposed at the bottom of the first bracket body 211_1. The first slide hole 211_2 may be formed to be longer in the first direction (e.g., the y-axis direction) than in the third direction (e.g., the x-axis direction). Accordingly, the first fixing part 251 inserted into the first slide hole 211_2 may slide in the first slide hole 211_2 in any one of the first direction (e.g., the y-axis direction) and the second direction (e.g., the −y-axis direction). The first slide hole 211_2 may be disposed to face a surface of the first arm 221 that faces a fourth direction (e.g., a surface disposed to face the −x-axis direction). At least a partial area of the first slide hole 211_2 may be aligned with a first connecting part 221_2 of the first arm 221. Accordingly, at least part of the first fixing part 251 may be disposed in the first slide hole 211_2 and the first connecting part 221_2.

The first rail 211_3 may be disposed at the opposite end of the first bracket body 211_1 that faces the second direction (e.g., the end facing the −y-axis direction) and may be disposed at the bottom of the first bracket body 211_1. The first rail 211_3 may have an arc shape with a predetermined internal angle. The first rail 211_3 may be inserted into the first rail groove 213a formed on the fixed bracket 213 and may rotate in a specified angle range along the first rail groove 213a. According to an embodiment, the first rail 211_3 may rotate, for example, in the range of −10 degrees to 100 degrees (or 0 degrees to 90 degrees). The first rail 211_3 may perform rotary motion between the y axis and the z axis about the first virtual axis 11 formed by the first rail groove 213a.

The first housing coupling holes 211_4 may be formed adjacent to an edge of the first bracket body 211_1 (e.g., an edge facing the y-axis direction) and may be formed through the upper surface (e.g., the surface facing the z-axis direction) and the lower surface (e.g., the surface facing the −z-axis direction) of the first bracket body 211_1. In the illustrated drawing, it has been exemplified that two first housing coupling holes 211_4 are formed in the first bracket body 211_1. However, the disclosure is not limited thereto. Coupling members may fix the first rotary bracket 211 to the first housing 110 by being coupled with bosses on the first housing 110 while being fastened to the first housing coupling holes 211_4.

The second rotary bracket 212 may include a second bracket body 212_1, a second slide hole 212_2 formed at one end (e.g., an end facing the x-axis direction) of the second bracket body 212_1, the second rail 212_3 formed at an opposite end (e.g., an end facing the y-axis direction) of the second bracket body 212_1, and second housing coupling holes 212_4 used to couple the second rotary bracket 212 with the second housing 120.

The second bracket body 212_1 may have substantially the same shape as the first bracket body 211_1. Accordingly, an upper surface (e.g., a surface disposed to face the z-axis direction) of the second bracket body 212_1 may be formed to be flat.

The second slide hole 212_2 may be disposed at a right end (e.g., an end facing the x-axis direction) of the second bracket body 212_1 and may be disposed at the bottom of the second bracket body 212_1. The second slide hole 212_2 may be disposed to be symmetric to the first slide hole 211_2 with respect to the fixed bracket 213. The second slide hole 212_2 may have the same shape as the first slide hole 211_2.

The second rail 212_3 may be disposed at the opposite end of the second bracket body 212_1 that faces the first direction (e.g., the end facing the y-axis direction) and may be disposed at the bottom of the second bracket body 212_1. The second rail 212_3 may have substantially the same shape as the first rail 211_3 and may be inserted into the second rail groove 213b. The second rail 212_3 may rotate about the second virtual axis 12 in a specified angle range, for example, in the range of 80 degrees to 190 degrees (or 90 degrees to 180 degrees). For example, the second rail 212_3 may perform rotary motion in the range between the −y-axis and the z-axis.

The second housing coupling holes 212_4 may be formed adjacent to an edge of the second bracket body 212_1 (e.g., an edge facing the −y-axis direction) and may be formed through the upper surface (e.g., the surface facing the z-axis direction) and the lower surface (e.g., the surface facing the −z-axis direction) of the second bracket body 212_1.

The first fixing part 251 may have a pin shape with a predetermined length in one direction. The first fixing part 251 may be formed to be longer than at least the sum of the length of the first slide hole 211_2 and the length of the first connecting part 221_2 of the first arm 221. Opposite sides of the first fixing part 251 may be fixed after the first fixing part 251 is inserted into the first slide hole 211_2 and the first connecting part 221_2. The first fixing part 251 may have a smaller diameter than the first connecting part 221_2. The first fixing part 251 may be located in the first slide hole 211_2 and may slide in the y-axis direction or the −y-axis direction.

The second fixing part 252 may have substantially the same shape as the first fixing part 251. The second fixing part 252 may be disposed to be symmetric to the first fixing part 251 with respect to the fixed bracket 213, and at least part of the second fixing part 252 may be fixedly inserted into the second slide hole 212_2 and a second connecting part 222_2. One side of the second fixing part 252 may slide in the second slide hole 212_2 in the y-axis direction or the −y-axis direction.

The first arm 221 may be fastened with the first rotary bracket 211 through the first fixing part 251 and may rotate within a specified angle range in conjunction with the first rotary bracket 211 during hinge motion. According to an embodiment, the first arm 221 may include a first basic body 221_1, the first connecting part 221_2, a first insertion part 221_3, and a first rotary cam 221_4.

An upper surface (e.g., a surface disposed to face the z-axis direction) of the first basic body 221_1 may be formed to be flat. The first connecting part 221_2 may be disposed on a lower surface (e.g., a surface facing the −z-axis direction) of an upper edge portion (e.g., an end portion facing the y-axis direction) of the first basic body 221_1. The first connecting part 221_2 may include a hole that is open in the fourth direction (e.g., the −x-axis direction). The first fixing part 251 may be fixedly mounted in the first connecting part 221_2.

The first insertion part 221_3 may be disposed on a lower surface (e.g., a surface facing the −z-axis direction) of a lower edge portion (e.g., an end portion facing the −y-axis direction) of the first basic body 221_1. The first insertion part 221_3 may include a hole that is open in the fourth direction (e.g., the −x-axis direction) and that has an at least partially angled cross-section. At least part of the first rotary member 231 may be mounted in the first insertion part 221_3. The first rotary cam 221_4 may be disposed on one side (e.g., an end facing the x-axis direction) of the first insertion part 221_3.

The first rotary cam 221_4 may include at least one ridge and valley disposed in the direction in which the first rotary member 231 is inserted into and protrudes from the first insertion part 221_3. According to an embodiment, the ridge and the valley may include, at an end thereof, a flat area with a predetermined length. Accordingly, while the first rotary cam 221_4 rotates in a state of being engaged with a first fixed cam 241_1a of the cam part 241, a section in which an end of the ridge of the first rotary cam 221_4 is brought into contact with an end of a ridge of the first fixed cam 241_1a may be formed by a specified width. In the case where the section in which the end of the ridge of the first rotary cam 221_4 is brought into contact with the end of the ridge of the first fixed cam 241_1a is formed by the specified width, a mounting state of the first housing 110 and the second housing 120 at a predetermined angle in the corresponding section may be more firmly maintained, and mounting states in various angle ranges may be provided.

The second arm 222 may have substantially the same configuration as the first arm 221. For example, the second arm 222 may include a second basic body 222_1, the second connecting part 222_2, a second insertion part 222_3, and a second rotary cam 222_4. The second basic body 222_1 may be disposed to be symmetric to the first basic body 221_1, and the second connecting part 222_2 may be fastened with one side of the second fixing part 252. The second rotary member 232 may be inserted into the second insertion part 222_3, and the second rotary cam 222_4 may be disposed to be engaged with a second fixed cam 241_1b of the cam part 241.

The first rotary member 231 may have one end mounted in the first mounting recess 213_2a formed on the fixed bracket 213. The first rotary member 231 may be engaged with the first idle gear 233. The first rotary member 231 may be disposed to pass through the stopper 236, the first insertion part 221_3, the first rotary cam 221_4, the first fixed cam 241_1a of the cam part 241, and the first elastic body 242a. The first rotary member 231 may be fixed to the support bracket 243. The first rotary member 231 may include a first shaft body 231_1, a first shaft gear 231_2, and the first mounting part 231_3.

The first shaft body 231_1 may have a length sufficient to pass through the stopper 236, the first insertion part 221_3, the first rotary cam 221_4, the first fixed cam 241_1a, the first elastic body 242a, and a first support bracket hole 243_2a of the support bracket 243. The first shaft body 231_1 may be coupled with the first rotary cam 221_4 and may have an angled cross-section in the direction of the y axis to rotate the first rotary cam 221_4 while being rotated by external pressure. For example, the first shaft body 231_1 may include a plurality of surfaces that are flat in the lengthwise direction (e.g., the x-axis direction or the −x-axis direction). Correspondingly, the inner wall of the first insertion part 221_3, on which the first rotary cam 221_4 is disposed, may have a shape corresponding to the cross-section of the first shaft body 231_1. The first shaft gear 231_2 may be disposed on the first shaft body 231_1 so as to be biased in the fourth direction (e.g., the −x-axis direction). The first shaft gear 231_2 may be engaged with the first idle gear 233.

The first mounting part 231_3 may protrude from a surface of the first shaft gear 231_2 that faces the fourth direction (e.g., a surface facing the −x-axis direction). At least part of the first mounting part 231_3 may pass through a guide hole formed in the support plate 235 and may be mounted in the first mounting recess 213_2a formed on the fixed bracket 213. The first fixing part 251 may fix the first rotary bracket 211 and the first arm 221, and therefore the first mounting part 231_3 may be firmly fixed to the first mounting recess 213_2a to prevent separation or torsion of the first shaft body 231_1.

The second rotary member 232 may have one end mounted in the second mounting recess 213_2b formed on the fixed bracket 213. The second rotary member 232 may be engaged with the second idle gear 234. The second rotary member 232 may be disposed to pass through the stopper 236, the second insertion part 222_3, the second rotary cam 222_4, the second fixed cam 241_1b of the cam part 241, and the second elastic body 242b. The second rotary member 232 may be fixed to the support bracket 243 at an opposite end thereof. The second rotary member 232 may include a second shaft body 232_1, a second shaft gear 232_2, and the second mounting part 232_3.

The second shaft body 232_1 may have a length sufficient to pass through the stopper 236, the second insertion part 222_3, the second rotary cam 222_4, the second fixed cam 241_1b, the second elastic body 242b, and a second support bracket hole 243_2b of the support bracket 243. The second shaft body 232_1 may have substantially the same shape and size as the first shaft body 231_1. The second shaft body 232_1 may be disposed in a position spaced apart from the first shaft body 231_1 by a predetermined length. The second shaft gear 232_2 may have the same shape and size as the first shaft gear 231_2 and may be disposed on the second shaft body 232_1. The position of the second shaft gear 232_2 may be symmetric to the position of the first shaft gear 231_2. At least part of the second mounting part 232_3 may have the same shape and size as the first mounting part 231_3 and may be mounted in the second mounting recess 213_2b. In this process, at least part of the second mounting part 232_3 may pass through a guide hole of the support plate 235 and may be mounted in the second mounting recess 213_2b. The second mounting part 232_3 may be more firmly mounted in the second mounting recess 213_2b in the process in which the second fixing part 252 fixes the second rotary bracket 212 and the second arm 222.

When pressure to cause the first arm 221 and the second arm 222 to be beyond a specified angle range is applied, the stopper 236 may support the corresponding pressure to prevent the first arm 221 and the second arm 222 from rotating through a specified angle or more. The stopper 236 may include a stopper body 236_1, a first shaft insertion hole 236a into which the first shaft body 231_1 of the first rotary member 231 is inserted, and a second shaft insertion hole 236b into which the second shaft body 232_1 of the second rotary member 232 is inserted.

According to various embodiments, the stopper body 236_1 may be formed to further protrude beyond the surfaces of the first shaft insertion hole 236a and the second shaft insertion hole 236b in the third direction (e.g., the x-axis direction). The stopper body 236_1 may be disposed to restrict the range of rotation of one side of the first arm 221 (e.g., a surface of the first insertion part 221_3 that faces the fourth direction (e.g., a surface facing the −x-axis direction)) while the first arm 221 rotates, and the stopper body 236_1 may be disposed to restrict the range of rotation of one side of the second arm 222 (e.g., a surface of the second insertion part 222_3 that faces the fourth direction (e.g., a surface facing the −x-axis direction)) while the second arm 222 rotates.

One side of the first shaft insertion hole 236a (e.g., a surface facing the x-axis direction) may be disposed to face a surface of the first insertion part 221_3 of the first arm 221 that faces the fourth direction (e.g., a surface facing the −x-axis direction), and one side of the second shaft insertion hole 236b (e.g., a surface facing the x-axis direction) may be disposed to face a surface of the second insertion part 222_3 of the second arm 222 that faces the fourth direction (e.g., a surface facing the −x-axis direction). A surface of the stopper body 236_1 that faces the third direction (e.g., a surface facing the x-axis direction) may be disposed to face a surface of a cam body 241_1 of the cam part 241 that faces the fourth direction (e.g., a surface facing the −x-axis direction).

The cam part 241 may include the cam body 241_1, the first fixed cam 241_1a, the second fixed cam 241_1b, a first cam hole 241_2a, and a second cam hole 241_2b. The cam body 241_1 may have a predetermined length, and the first fixed cam 241_1a and the second fixed cam 241_1b may be disposed at opposite edges of the cam body 241_1. The surface of the cam body 241_1 that faces the fourth direction (e.g., the surface facing the −x-axis direction) may be disposed to face the surface of the stopper body 236_1 that faces the third direction (e.g., the surface facing the x-axis direction). The first fixed cam 241_1a may include ridges and valleys disposed in the fourth direction (e.g., the −x-axis direction), and the first cam hole 241_2a through which the first rotary member 231 passes may be formed in the center of the first fixed cam 241_1a. The first fixed cam 241_1a may be engaged with the first rotary cam 221_4. One side of the first elastic body 242a may be brought into contact with a surface of the first fixed cam 241_1a that faces the third direction (e.g., a surface facing the x-axis direction). The second fixed cam 241_1b may be disposed in the same direction as the first fixed cam 241_1a and may be disposed to be spaced apart from the first fixed cam 241_1a by the length of the cam body 241_1 in the y-axis direction. The second fixed cam 241_1b may be engaged with the second rotary cam 222_4, and the second elastic body 242b may be brought into contact with a surface of the second fixed cam 241_1b that faces the third direction (e.g., a surface facing the x-axis direction). The second cam hole 241_2b through which the second rotary member 232 passes may be formed in the center of the second fixed cam 241_1b.

According to various embodiments, the cam part 241 may be moved backward in the third direction (e.g., the x-axis direction) by the first rotary cam 221_4 and the second rotary cam 222_4 while the first arm 221 and the second arm 222 rotate within a predetermined angle range, and the cam part 241 may be moved in the fourth direction (e.g., the −x-axis direction) by the elasticity of the first elastic body 242a and the second elastic body 242b to return to the original position when the ridges and valleys of the cams are engaged with each other.

The first elastic body 242a may have a coil spring shape with an empty space inside. The first shaft body 231_1 of the first rotary member 231 that passes through the first fixed cam 241_1a may be inserted into the first elastic body 242a. The first elastic body 242a and the second elastic body 242b may be disposed between the cam part 241 and the support bracket 243 and may act to push the cam part 241 in the fourth direction (e.g., the −x-axis direction) relative to the support bracket 243 fixed. The second elastic body 242b may be disposed to be spaced apart from the first elastic body 242a at a specified interval and may be disposed to be brought into contact with a surface of the second fixed cam 241_1b that faces the third direction (e.g., a surface facing the x-axis direction).

The support bracket 243 may include a support part 243_1, the first support bracket hole 243_2a, and the second support bracket hole 243_2b. The support part 243_1 may include a through-hole 243_1a formed through the support part 243_1 in the vertical direction (e.g., the −z-axis direction from one point on the z-axis). The through-hole 243_1a may be used to fix the support bracket 243 to the hinge housing 150. The first support bracket hole 243_2a may be disposed to protrude from one side of the support part 243_1 and may support one side of the first elastic body 242a. Furthermore, one end of the first rotary member 231 may be inserted into the first support bracket hole 243_2a. The second support bracket hole 243_2b may be disposed in a position spaced apart from the first support bracket hole 243_2a by a predetermined distance. The second support bracket hole 243_2b may be disposed to protrude from an opposite side of the support part 243_1 and may support one side of the second elastic body 242b. Furthermore, one end of the second rotary member 232 may be inserted into the second support bracket hole 243_2b.

The first idle gear 233 may be disposed between the first shaft gear 231_2 and the second shaft gear 232_2 and may be engaged with the first shaft gear 231_2 and the second idle gear 234. The first idle gear 233 may include a protrusion inserted into a guide hole formed in the support plate 235 and a protrusion fixed to a surface of the stopper 236 that faces the fourth direction (e.g., a surface facing the −x-axis direction).

The second idle gear 234 may be disposed between the first shaft gear 231_2 and the second shaft gear 232_2 and may be engaged with the first idle gear 233 and the second shaft gear 232_2. The second idle gear 234 may be formed to have substantially the same shape and size as the first idle gear 233. The second idle gear 234 may include a protrusion inserted into a guide hole formed in the support plate 235 and a protrusion fixed to the surface of the stopper 236 that faces the fourth direction (e.g., the surface facing the −x-axis direction). In this regard, the stopper 236 may have, on the surface facing the fourth direction (e.g., the surface facing the −x-axis direction), recesses or holes in which the protrusion of the first idle gear 233 and the protrusion of the second idle gear 234 are mounted.

The support plate 235 may be disposed between the fixed bracket 213 and the rotary members 231 and 232 and may be disposed to prevent separation of the rotary members 231 and 232 and the idle gears 233 and 234. In this regard, the support plate 235 may include a plurality of guide holes. For example, the support plate 235 may include the guide hole through which the first mounting part 231_3 of the first rotary member 231 passes, the guide hole through which the second mounting part 232_3 of the second rotary member 231 passes, and the guide holes (or the guide recesses) in which the protrusion of the first idle gear 233 and the protrusion of the second idle gear 234 are mounted.

The plurality of fixing clips 291_1, 291_2, 292_1, 292_2, 249_1, and 249_2 may fix one or more components included in the first hinge structure 200a to prevent the components from being separated from the corresponding positions and may allow the corresponding components to rotate. The plurality of fixing clips 291_1, 291_2, 292_1, 292_2, 249_1, and 249_2 may include, for example, a C-clip. The plurality of fixing clips 291_1, 291_2, 292_1, 292_2, 249_1, and 249_2 may include, for example, the first fixing clip 291_1 for fixing the first fixing part 251 to a surface of the first connecting part 221_2 that faces the third direction (e.g., a surface facing the x-axis direction), the second fixing clip 291_2 for fixing the second fixing part 252 to a surface of the second connecting part 222_2 that faces the third direction (e.g., a surface facing the x-axis direction), the third fixing clip 292_1 coupled to the first mounting part 231_3 to prevent the first mounting part 231_3 of the first rotary member 231 from being separated from the support plate 235, the fourth fixing clip 292_2 coupled to the second mounting part 232_3 to prevent the second mounting part 232_3 of the second rotary member 232 from being separated from the support plate 235, the fifth fixing clip 249_1 coupled to an end of the first rotary member 231 to prevent the first rotary member 231 from being separated from the first support bracket hole 243_2a of the support bracket 243, and the sixth fixing clip 249_2 coupled to an end of the second rotary member 232 to prevent the second rotary member 232 from being separated from the second support bracket hole 243_2b of the support bracket 243.

Figure 5:
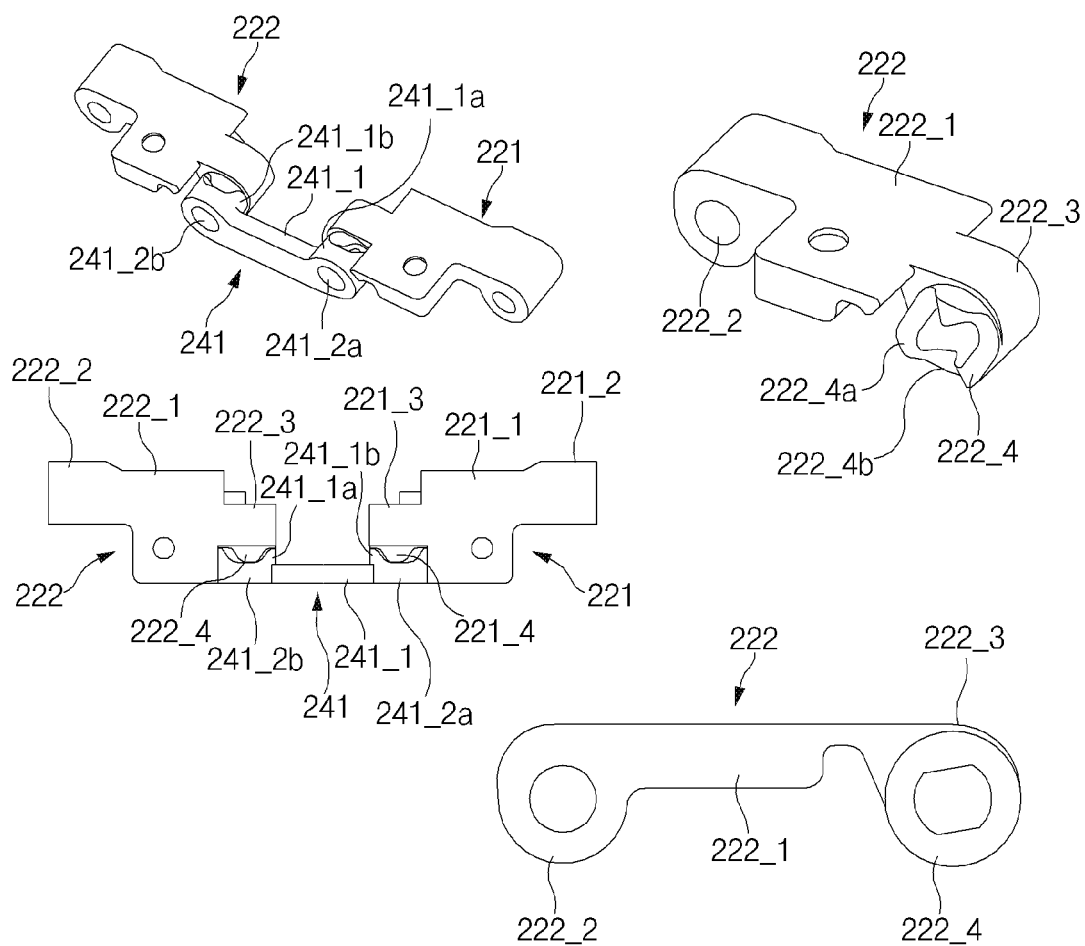
FIG. 5 illustrates a view of a cam structure of the hinge structure according to various embodiments.

FIG. 5 illustrates a view of a cam structure of the hinge structure according to various embodiments.

Referring to FIG. 5, the cam structure of the hinge structure according to an embodiment may include the first arm 221, the cam part 241, and the second arm 222. As mentioned above, the first arm 221 may include the first basic body 221_1, the first connecting part 221_2, the first insertion part 221_3, and the first rotary cam 221_4, and the second arm 222 may include the second basic body 222_1, the second connecting part 222_2, the second insertion part 222_3, and the second rotary cam 222_4. The second rotary cam 222_4 (or the first rotary cam 221_4) may include at least one ridge 222_4a and valley 222_4b. The top of the ridge 222_4a may include a flat area with a predetermined width. Similarly to the top of the ridge 222_4a, the bottom of the valley 222_4b may include a flat area with a predetermined width. The size and shape of the flat area at the top of the ridge 222_4a may be the same as or similar to the size and shape of the flat area at the bottom of the valley 222_4b.

The upper surface of the first basic body 221_1 of the first arm 221 may be formed to be flat and may be disposed adjacent to the first bracket body 211_1 of the first rotary bracket 211. The first basic body 221_1 may be disposed side by side with the first bracket body 211_1 when the electronic device 100 is in the first state (e.g., a flat state) or the second state (e.g., a folded state). Alternatively, the upper surface of the first basic body 221_1 may have the same height as the upper surface of the first bracket body 211_1. The second basic body 222_1 of the second arm 221 may be disposed adjacent to the second bracket body 212_1 of the second rotary bracket 212. In the first state (e.g., a flat state) and the second state (e.g., a folded state), the upper surface of the second basic body 222_1 may have the same height as the upper surface of the second bracket body 212_1.

The cam part 241 may include the cam body 241_1, the first fixed cam 241_1a, and the second fixed cam 241_1b. The first fixed cam 241_1a may be disposed to be engaged with the first rotary cam 221_4 of the first arm 221. The first fixed cam 241_1a may have the first cam hole 241_2a formed in the center thereof. Part of the first rotary member 231 may be inserted into the first cam hole 241_2a of the first fixed cam 241_1a. The first fixed cam 241_1a may include a ridge and a valley to correspond to the shape of the first rotary cam 221_4. The ridge may include, at the top, a flat area with a specified length, and the valley may include, at the bottom, a flat area with a specified length. The second fixed cam 241_1b may be formed to have substantially the same shape and size as the first fixed cam 241_1a and may have the second cam hole 241_2b formed in the center thereof, and at least part of the second rotary member 232 may be inserted into the second cam hole 241_2b. The second fixed cam 241_1b may be disposed to be engaged with the second rotary cam 222_4. The shapes of a ridge and a valley of the second fixed cam 241_1b may be provided in forms that correspond to the shapes of the ridge and the valley of the second rotary cam 222_4.

Figure 6:
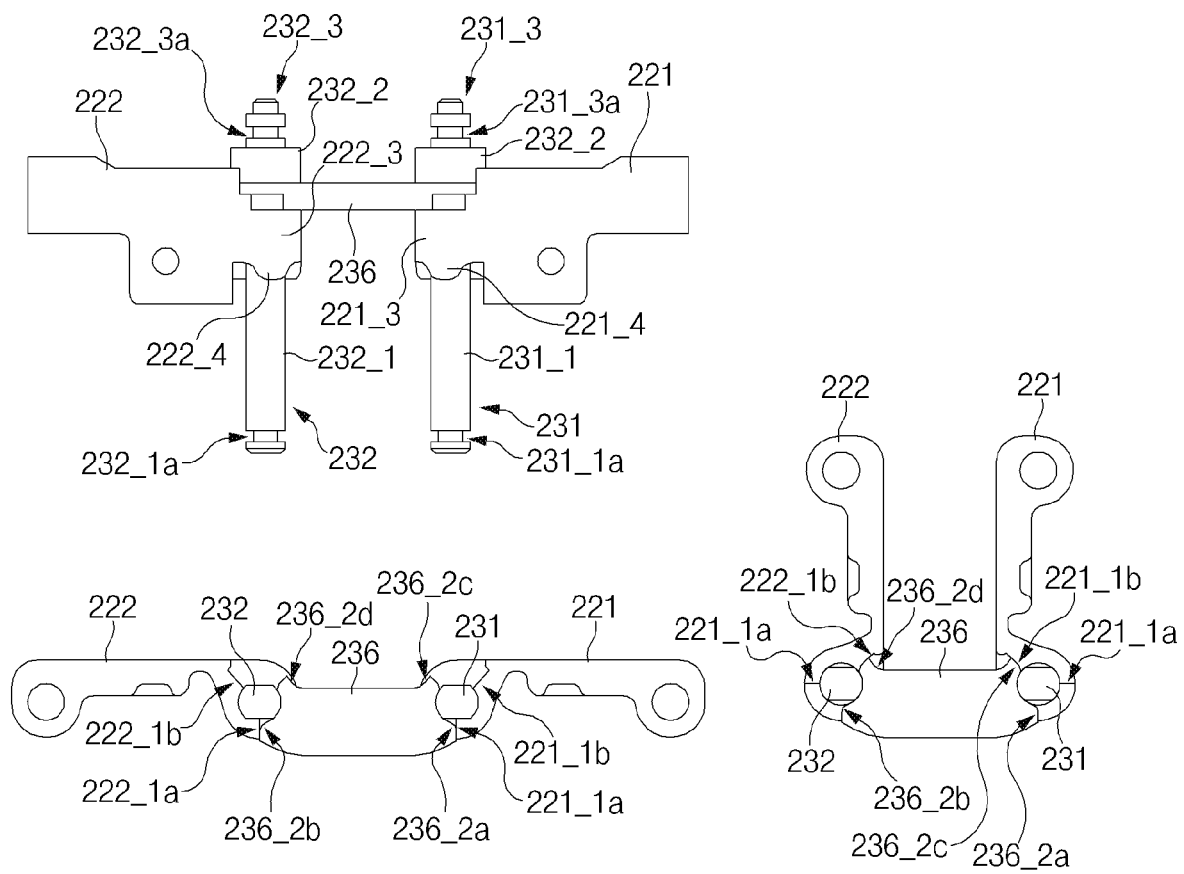
FIG. 6 illustrates a view of a stopper connecting structure of the hinge structure according to various embodiments.

FIG. 6 illustrates a view of a stopper connecting structure of the hinge structure according to various embodiments.

Referring to FIG. 6, the stopper connecting structure of the hinge structure according to an embodiment may include the first arm 221, the second arm 222, the first rotary member 231, the second rotary member 232, and the stopper 236.

As described above with reference to FIG. 4, the first rotary member 231 may include the first shaft body 231_1, the first shaft gear 231_2, and the first mounting part 231_3 that are continuously disposed. The first shaft body 231_1 may have a specified length such that the stopper 236, the first insertion part 221_3, the first rotary cam 221_4, the cam part 241, and the first elastic body 242*a* are mounted on the first shaft body 231_1. With regard to rotation of the first arm 221, at least part of the exterior of the first shaft body 231_1 may have an angled shape (e.g., a polygonal cross-sectional shape or a shape including a plurality of faces). The first shaft body 231_1 may have, on end portion thereof (e.g., an end portion on the opposite side to the first mounting part 231_3), a first fixing groove 231_1*a* into which a fixing clip (e.g., the fifth fixing clip 249_1) is inserted to fix the first shaft body 231_1 to the support bracket 243. A second fixing groove 231_1*a* may be disposed on one side of the first mounting part 231_3, and a fixing clip (e.g., the third fixing clip 292_1) may be inserted into the second fixing groove 231_1*a* to prevent the first mounting part 231_3 inserted into and mounted in the first mounting recess 213_2*a* from being separated from the support plate 235.

Similarly to the first rotary member 231, the second rotary member 232 may include the second shaft body 232_1, the second shaft gear 232_2, and the second mounting part 232_3 that are continuously disposed. The second shaft body 232_1 may be provided similarly or identically to the first shaft body 231_1. The second shaft body 232_1 may have, on end portion thereof (e.g., an end portion on the opposite side to the second mounting part 232_3), a third fixing groove 232_1*a* into which a fixing clip (e.g., the sixth fixing clip 249_2) is inserted to fix the second shaft body 232_1 to the support bracket 243. A fourth fixing groove 232_3*a* may be disposed on one side of the second mounting part 232_3, and a fixing clip (e.g., the fourth fixing clip 292_2) may be inserted into the fourth fixing groove 232_3*a* to prevent the second mounting part 232_3 inserted into and mounted in the second mounting recess 213_2*b* from being separated from the support plate 235.

The stopper 236 may include the stopper body 236_1, the first shaft insertion hole 236*a*, and the second shaft insertion hole 236*b*. The first shaft insertion hole 236*a* may be disposed between the first arm 221 mounted on the first shaft body 231_1 and the first shaft gear 231_2. The second shaft insertion hole 236*b* may be disposed between the second arm 222 mounted on the second shaft body 232_1 and the second shaft gear 232_2. The stopper body 236_1 may include a first stopper 236_2*a* disposed to support one side 221_1*a* of the first arm 221 when the electronic device 100 is in a flat state and a second stopper 236_2*b* disposed to support one side 222_1*a* of the second arm 222 when the electronic device 100 is in the flat state. According to an embodiment, the stopper body 236_1 may include a third stopper 236_2*c* disposed to support an opposite side 221_1*b* of the first arm 221 when the electronic device 100 is in a folded state and a fourth stopper 236_2*d* disposed to support an opposite side 222_1*b* of the second arm 222 when the electronic device 100 is in the folded state. Based on the structure of the stopper 236 described above, the first arm 221 and the second arm 222 may be supported so as not to additionally rotate in the rotating directions in the flat state or the folded state.

Figure 7:
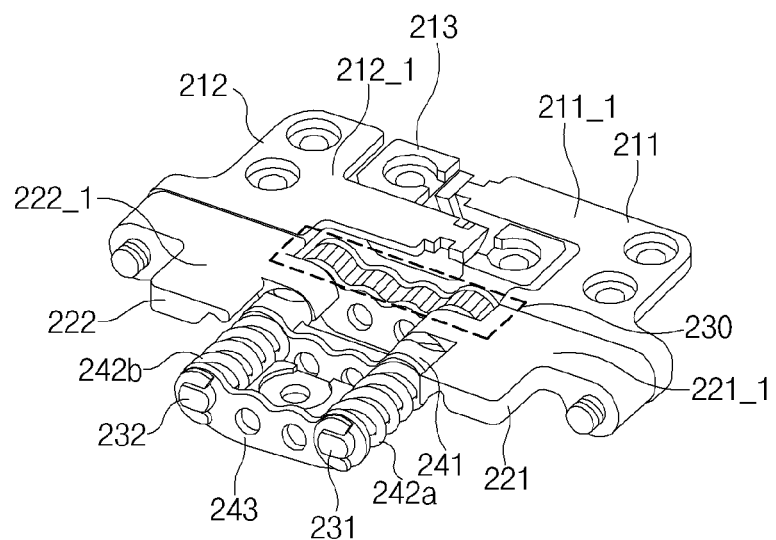
FIG. 7 illustrates a view of a first state of some components of the electronic device according to various embodiments.
Figure 7:
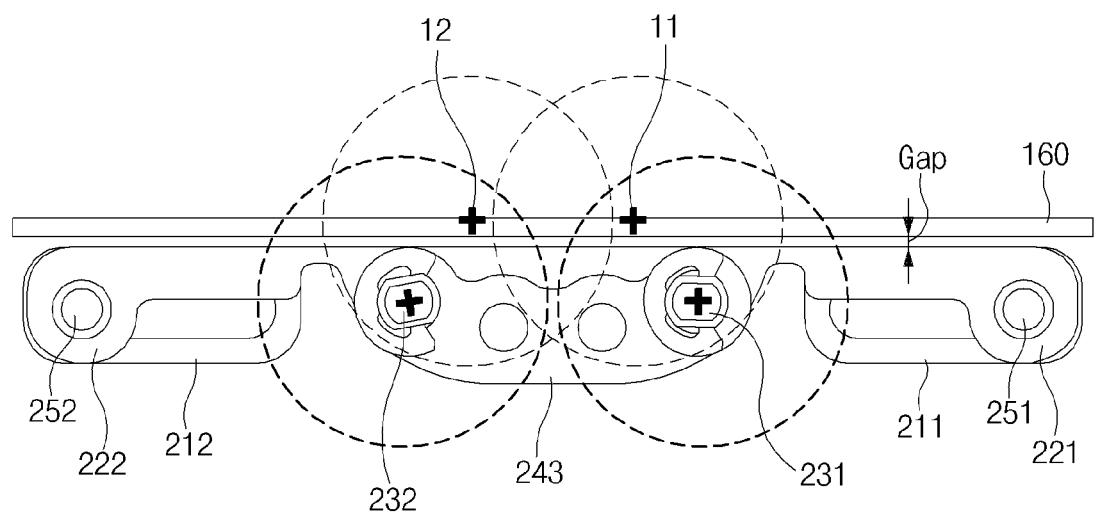

FIG. 7 illustrates a view of a first state of some components of the electronic device according to various embodiments.

Referring to FIGS. 1A and 7, some components of the electronic device may include the first hinge structure 200*a* and the display 160, and the first hinge structure 200*a* and the display 160 may have the first state (e.g., a flat state).

As described above, the first hinge structure 200*a* may include the first rotary bracket 211, the second rotary bracket 212, the fixed bracket 213, the first arm 221, the second arm 222, the gear structure 230 including the shaft gears and the idle gears of the first rotary member 231 and the second rotary member 232, the cam part 241, the first elastic body 242*a*, the second elastic body 242*b*, the first rotary member 231, the second rotary member 232, and the support bracket 243. The first rotary bracket 211 may be connected with the first arm 221 through the first fixing part 251. The second rotary bracket 212 may be connected with the second arm 222 through the second fixing part 252.

The display 160 may remain in a flat state while the first rotary bracket 211 and the second rotary bracket 212 are maintained in a flat state. The first arm 221 may rotate about the first rotary member 231 within a specified angle range. The second arm 222 may rotate about the second rotary member 232 within the specified angle range. The first rotary bracket 211 may rotate about the first virtual axis 11 within an angle range that is similar to, or the same as, that of the first arm 221. The second rotary bracket 212 may rotate about the second virtual axis 12 within an angle range that is similar to, or the same as, that of the second arm 222. The first virtual axis 11 may be formed in a higher position than the first rotary member 231 in the direction toward the display 160. The second virtual axis 12 may be formed in a higher position than the second rotary member 232 in the direction toward the display 160. The interval between the first virtual axis 11 and the second virtual axis 12 may be shorter than the interval between the first rotary member 231 and the second rotary member 232. According to various embodiments, the first virtual axis 11 and the second virtual axis 12 may be formed side by side on a horizontal axis. According to an embodiment, the first virtual axis 11 and the second virtual axis 12 may be formed at the same height as the display 160, or may be formed above the display 160 (e.g., in the air above the display 160.).

The first bracket body 211_1 of the first rotary bracket 211 and the second bracket body 212_1 of the second rotary bracket 212 may be disposed side by side while the first rotary bracket 211 and the second rotary bracket 212 are maintained in a flat state. According to an embodiment, the upper surface of the first bracket body 211_1 and the upper surface of the second bracket body 212_1 may be identically disposed to face upward with respect to the illustrated drawing.

According to an embodiment, the first arm 221 and the second arm 222 may also be disposed side by side while the first rotary bracket 211 and the second rotary bracket 212 are maintained in the flat state, and thus both the first basic body 221_1 of the first arm 221 and the second basic body 222_1 of the second arm 222 may face the same direction (e.g., the upper direction with respect to the illustrated drawing). Accordingly, the first bracket body 211_1, the second bracket body 212_1, the first basic body 221_1, and the second basic body 222_1 may all be disposed side by side with respect to the horizontal axis and may all be disposed to face the same upper direction with respect to the illustrated drawing. The first bracket body 211_1, the second bracket body 212_1, the first basic body 221_1, and the second basic body 222_1 may support the rear surface of the display 160 without a height difference therebetween.

According to various embodiments, a predetermined gap Gap_1 may be formed between the central portion 163 of the display 160, which is bendable, and the hinge structures 200a and 200b. An adhesive layer may be disposed on peripheral areas (e.g., the upper portion 161 or the lower portion 162) other than the central portion 163 of the display 160.

Figure 8:
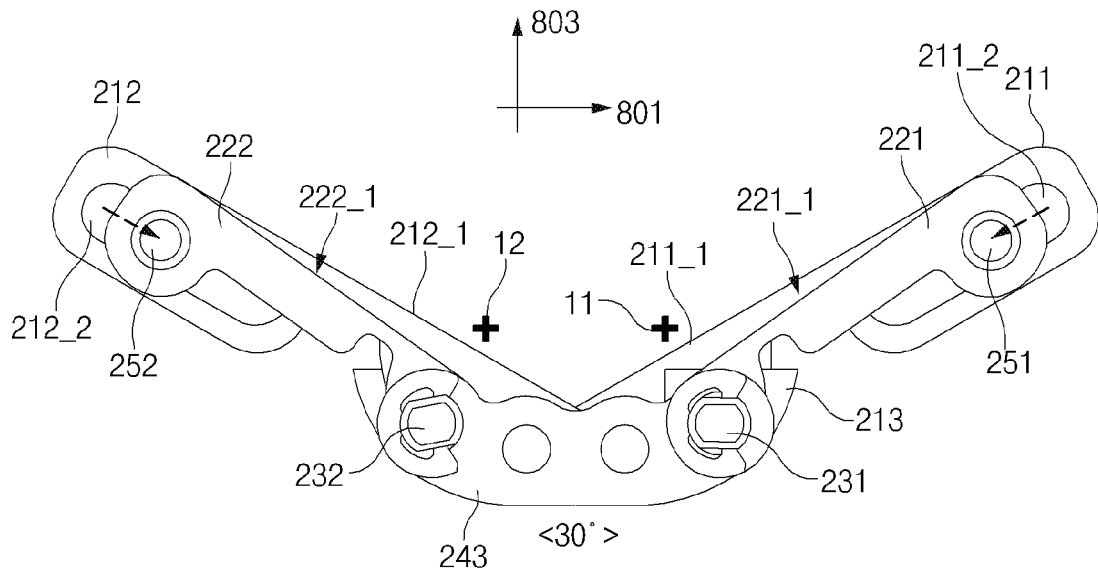
FIG. 8 illustrates a view of a first specified angle state of a first hinge structure according to various embodiments.
Figure 8:
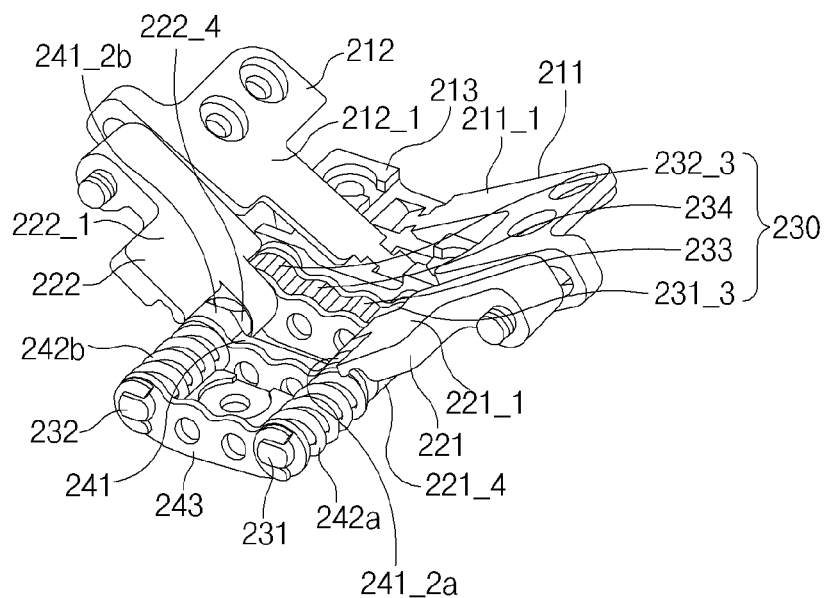

FIG. 8 illustrates a view of a first specified angle state of the first hinge structure according to various embodiments.

Referring to FIGS. 1A and 8, the first hinge structure 200a may include the first specified angle state. As described above, the first hinge structure 200a may include the first rotary bracket 211, the second rotary bracket 212, the fixed bracket 213, the first arm 221, the second arm 222, the gear structure 230, the cam part 241, the first elastic body 242a, the second elastic body 242b, the first rotary member 231, the second rotary member 232, and the support bracket 243. The first rotary bracket 211 may be connected with the first arm 221 through the first fixing part 251. The second rotary bracket 212 may be connected with the second arm 222 through the second fixing part 252.

A first housing (e.g., the first housing 110 of FIG. 1A) to which the first rotary bracket 211 is fixed or a second housing (e.g., the second housing 120 of FIG. 1A) to which the second rotary bracket 212 is fixed may be rotated by a predetermined angle in the direction of a vertical axis 803 from one point on a horizontal axis 801 with respect to the illustrated drawing by external pressure. For example, the first rotary bracket 211 connected to the first housing 110 may rotate about the first virtual axis 11 by a first angle (e.g., 30 degrees) in the direction of the vertical axis 803 (e.g., the z axis of FIG. 4) from one point on the horizontal axis 801 (e.g., the −y-axis or the y axis of FIG. 4) (e.g., in the direction of the vertical axis 803 from the right with respect to the illustrated drawing). When the first rotary bracket 211 is rotated by the first angle by external pressure, the corresponding pressure may be transmitted to the first arm 221 through the first fixing part 251. Accordingly, the first arm 221 may rotate about the first rotary member 231 by the first angle in the direction of the vertical axis 803 on the horizontal axis 801. In this operation, the force depending on the rotary motion may be transmitted to the first rotary cam 221_4 and the first insertion part 221_3. The first rotary member 231, one side of which is inserted into the first insertion part 221_3, may rotate as the first insertion part 221_3 rotates, and the first shaft gear 231_2 of the first rotary member 231 may rotate depending on the rotation of the first rotary member 231. The first idle gear 233 and the second idle gear 234 engaged with each other may rotate depending on the rotation of the first shaft gear 231_2. Consequently, the second shaft gear 232_2 may rotate, and the second rotary member 232 may rotate correspondingly. The second insertion part 222_3 may rotate depending on the rotation of the second rotary member 232, the second arm 222 may rotate depending on the rotation of the second insertion part 222_3, and the second rotary bracket 212 connected to the second arm 222 through the second fixing part 252 may rotate depending on the rotation of the second arm 222.

As described above, the first hinge structure 200a may have the structure in which the first rotary bracket 211 and the second rotary bracket 212 are simultaneously rotated by external pressure (or force). Accordingly, the first rotary bracket 211 and the second rotary bracket 212 may be simultaneously rotated even though external pressure is applied to the second housing 120 to which the second rotary bracket 212 is connected, or external pressure is simultaneously applied to the first housing 110 and the second housing 120. As the first housing 110 and the second housing 120 of the electronic device 100 of the disclosure are simultaneously rotated, torsion of the first housing 110 and the second housing 120 may be suppressed, and accurate hinge motion may be performed.

According to various embodiments, the ridge of the first rotary cam 221_4 and the ridge of the second rotary cam 222_4 may remain brought into contact with the vicinity of the top of the ridge of the first fixed cam 241_1a and the vicinity of the top of the ridge of the second fixed cam 241_1b as the first arm 221 and the second arm 222 rotate by the first specified angle.

According to an embodiment, the first virtual axis 11 of the first rotary bracket 211 and the second virtual axis 12 of the second rotary bracket 212 may be disposed between the first rotary member 231 of the first arm 221 and the second rotary member 232 of the second arm 222, and therefore the amount of rotation of the first rotary bracket 211 may differ from the amount of rotation of the first arm 221. Accordingly, the upper surface of the first bracket body 211_1 of the first rotary bracket 211 may further protrude upward beyond the upper surface of the first basic body 221_1 of the first arm 221 with respect to the horizontal axis 801. As the first rotary bracket 211 and the first arm 221 are connected through the first fixing part 251, the first fixing part 251 may slide a predetermined distance along the first slide hole 211_2 of the first rotary bracket 211 while the first rotary bracket 211 rotates. Similarly, the upper surface of the second bracket body 212_1 may be rotated to further protrude beyond the second basic body 222_1 with respect to the horizontal axis 801. Furthermore, as the second rotary bracket 212 and the second arm 222 are connected through the second fixing part 252, the second fixing part 252 may slide a predetermined distance along the second slide hole 212_2 of the second rotary bracket 212 while the second rotary bracket 212 rotates.

Figure 9:
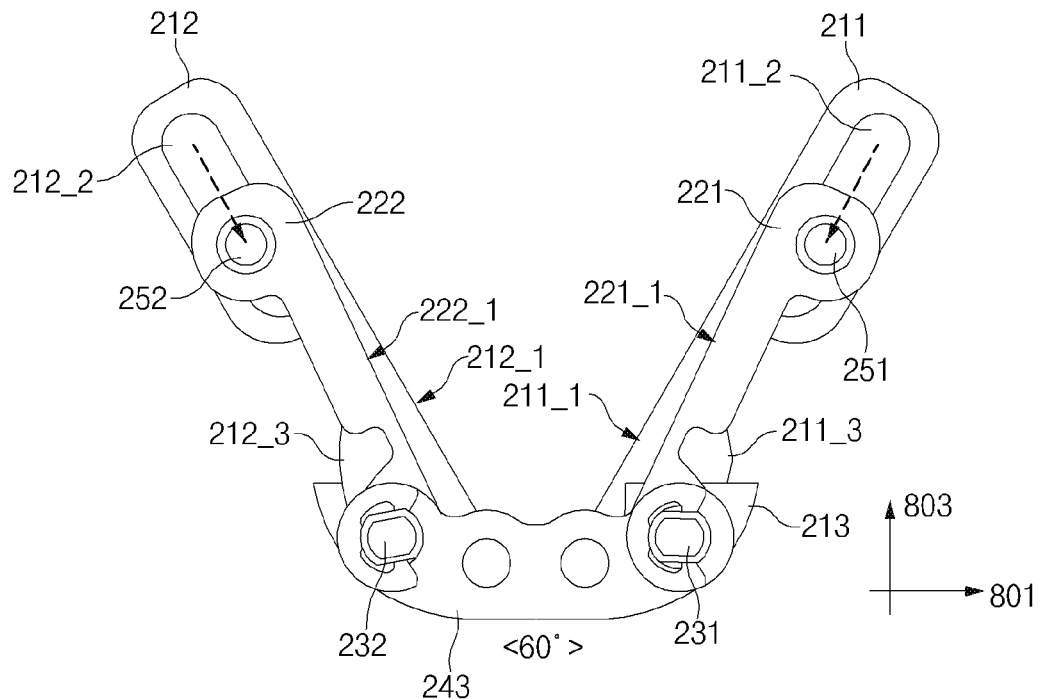
FIG. 9 illustrates a view of a second specified angle state of the first hinge structure according to various embodiments.
Figure 9:
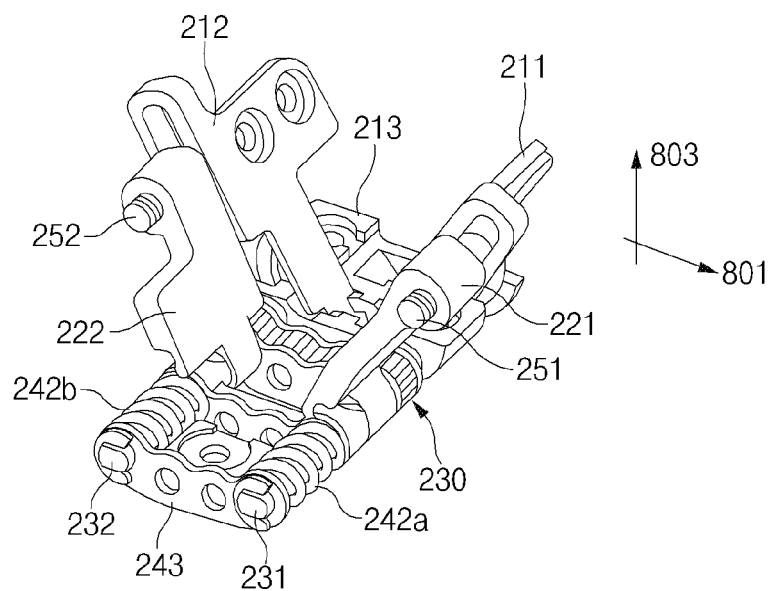

FIG. 9 illustrates a view of a second specified angle state of the first hinge structure according to various embodiments.

Referring to FIGS. 1A and 9, the first hinge structure 200a may include the second specified angle state. The first hinge structure 200a may include, for example, the first rotary bracket 211, the second rotary bracket 212, the fixed bracket 213, the first arm 221, the second arm 222, the gear structure 230, the cam part 241, the first elastic body 242a, the second elastic body 242b, the first rotary member 231, the second rotary member 232, and the support bracket 243. The first rotary bracket 211 may be connected with the first arm 221 through the first fixing part 251, and the second rotary bracket 212 may be connected with the second arm 222 through the second fixing part 252.

A first housing (e.g., the first housing 110 of FIG. 1A) or a second housing (e.g., the second housing 120 of FIG. 1A) may be rotated by a second angle (e.g., 60 degrees) in the direction of the vertical axis 803 from one point on the horizontal axis 801 with respect to the illustrated drawing by external pressure (or force). For example, when external pressure or force is transmitted to the first housing 110 or the second housing 120, the first rotary bracket 211 or the second rotary bracket 212 may rotate about the first virtual axis 11 or the second virtual axis 12 by the second angle (e.g., 60 degrees) in the direction of the vertical axis 803 from one point on the horizontal axis 801 (e.g., in the direction of the vertical axis 803 from the right with respect to the illustrated drawing). In the process of performing the above-described operation, the applied force may be mutually transmitted through the first arm 221 or the second arm 222, the first rotary member 231, the second rotary member 232, and the gear structures 230, and the first rotary bracket 211, the second rotary bracket 212, the first arm 221, and the second arm 222 may simultaneously rotate.

When the first rotary bracket 211 and the second rotary bracket 212 rotate through the second angle, the first fixing part 251 and the second fixing part 252 may slide closer to the fixed bracket 213 in the first slide hole 211_2 and the second slide hole 212_2 than when the first rotary bracket 211 and the second rotary bracket 212 rotate through the first angle. In the above operation process, the first rail 211_3 of the first rotary bracket 211 may rotate outward from the center of the fixed bracket 213 to the right with respect to the illustrated drawing, and the second rail 212_3 of the second rotary bracket 212 may rotate outward from the center of the fixed bracket 213 to the left with respect to the illustrated drawing. As the axes of rotation of the first rotary bracket 211 and the first arm 221 differ from each other and the axes of rotation of the second rotary bracket 212 and the second arm 222 differ from each other, the distance between the upper surface of the first bracket body 211_1 and the upper surface of the second bracket body 212_1 may be formed to be shorter than the distance between the upper surface of the first basic body 221_1 and the upper surface of the second basic body 222_1 with an approach to the fixed bracket 213.

Figure 10:
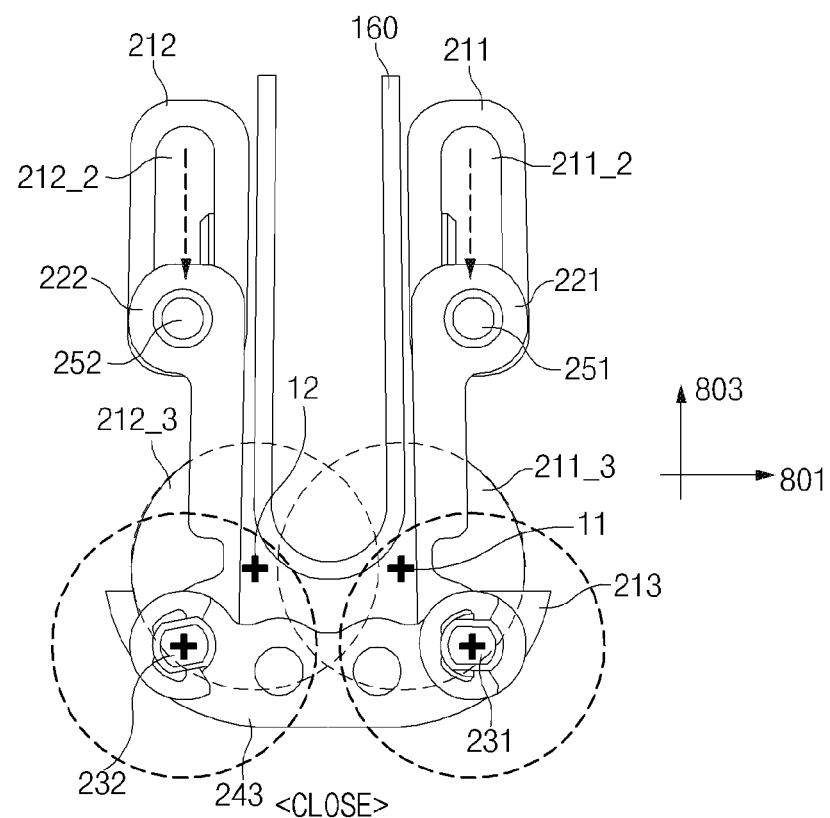
FIG. 10 illustrates a view of a second state of some structures of the electronic device according to various embodiments.
Figure 10:
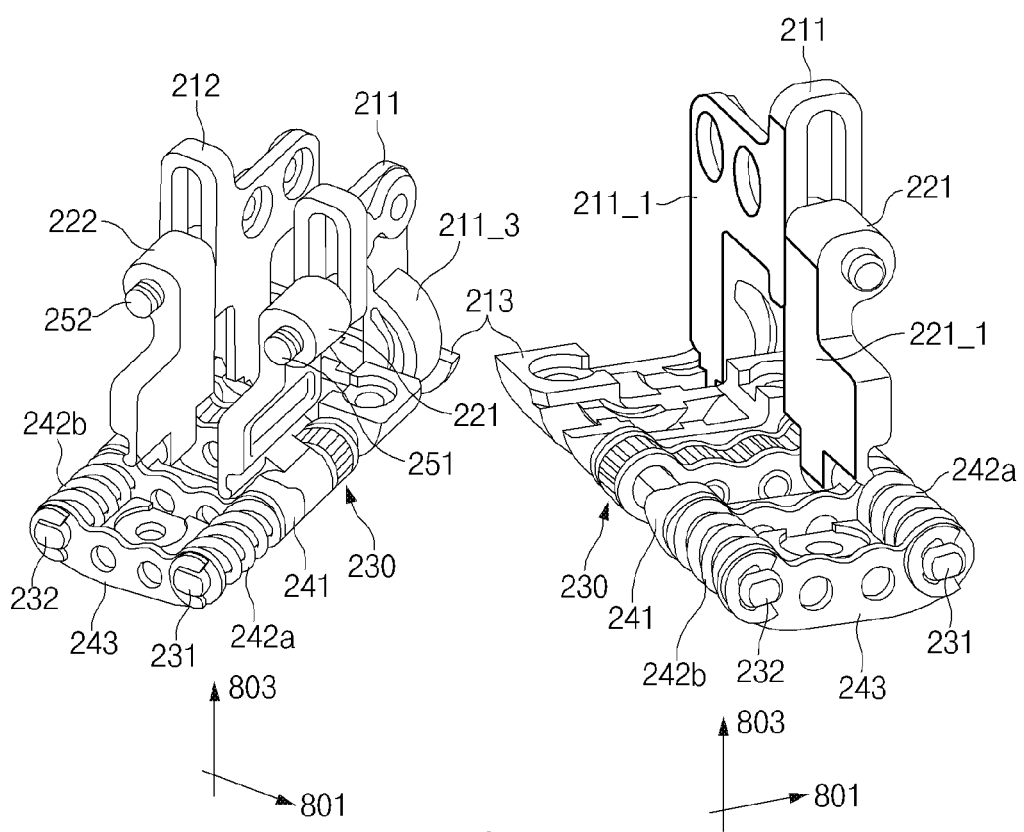

FIG. 10 illustrates a view of a second state of some structures of the electronic device according to various embodiments.

Referring to FIGS. 1A and 10, the electronic device 100 may include the first hinge structure 200a and the display 160. The second state of the first hinge structure 200a may include a folded state. The first hinge structure 200a may include, for example, the fixed bracket 213, the first rotary bracket 211, the second rotary bracket 212, the first arm 221, the second arm 222, the first fixing part 251, the second fixing part 252, the first rotary member 231, the second rotary member 232, the gear structure 230 including the shaft gears of the first rotary member 231 and the second rotary member 232, the first elastic body 242a, the second elastic body 242b, and the support bracket 243.

In the above-described structure, the first rotary bracket 211 and the second rotary bracket 212 may be disposed to face each other. As the edges of the first housing 110 and the second housing 120 are located adjacent to each other with respect to the illustrated drawing, the first rotary bracket 211 may rotate about the first virtual axis 11 and may be inclined to the left at a specified angle with respect to the vertical axis 803 in the illustrated drawing. Furthermore, the second rotary bracket 212 may rotate about the second virtual axis 12 and may be inclined to the right at the specified angle with respect to the vertical axis 803. The first virtual axis 11 may be the central axis of rotation of the first rail 211_3, and the second virtual axis 12 may be the central axis of rotation of the second rail 212_3. The first arm 221 may rotate about the first rotary member 231 and may be located side by side with the first rotary bracket 211, and the second arm 222 may rotate about the second rotary member 232 and may be located side by side with the second rotary bracket 212. Accordingly, the central portion of the display 160 may be bent in a "U" shape, and the remaining area may be maintained in a flat state.

As the first rotary bracket 211 and the first arm 221 are vertically located (or inclined to the left at the specified angle with respect to the vertical axis 803), the upper surface of the first bracket body 211_1 of the first rotary bracket 211 and the upper surface of the first basic body 221_1 of the first arm 221 may be disposed side by side without a height difference therebetween. Due to the difference in length between the first rotary bracket 211 and the first arm 221, the first fixing part 251 may be located at the lower edge of the first slide hole 211_2 of the first rotary bracket 211. When the electronic device 100 is in a flat state, the first fixing part 251 may be located at the upper edge of the first slide hole 211_2 of the first rotary bracket 211. Similarly, when the electronic device 100 is in a folded state, the second fixing part 252 may be located at the lower edge of the second slide hole 212_2.

The first rotary bracket 211 may rotate outward from the central portion of the fixed bracket 213 to the right with respect to the illustrated drawing while the electronic device 100 is changed from a first state to a second state (e.g., a folded state), and the first rotary bracket 211 may rotate in the direction from the right side of the fixed bracket 213 to the central portion thereof with respect to the illustrated drawing while the electronic device 100 is changed from the second state to the first state (e.g., a flat state). According to an embodiment, the second rotary bracket 212 may rotate outward from the central portion of the fixed bracket 213 to the left with respect to the illustrated drawing while the electronic device 100 is changed from the first state to the second state (e.g., a folded state), and the second rotary bracket 212 may rotate in the direction from the left side of the fixed bracket 213 to the central portion thereof with respect to the illustrated drawing while the electronic device 100 is changed from the second state to the first state (e.g., a flat state). While the electronic device 100 is maintained in the folded state, the ridges and valleys of the cam part 241 may be engaged with the valleys and ridges of the rotary cams disposed on the first arm 221 and the second arm 222. Accordingly, the first elastic body 242a and the second elastic body 242b may return to the initial state (e.g., a released state) from a state of being compressed in the first specified angle state and the second specified angle state.

Figure 11:
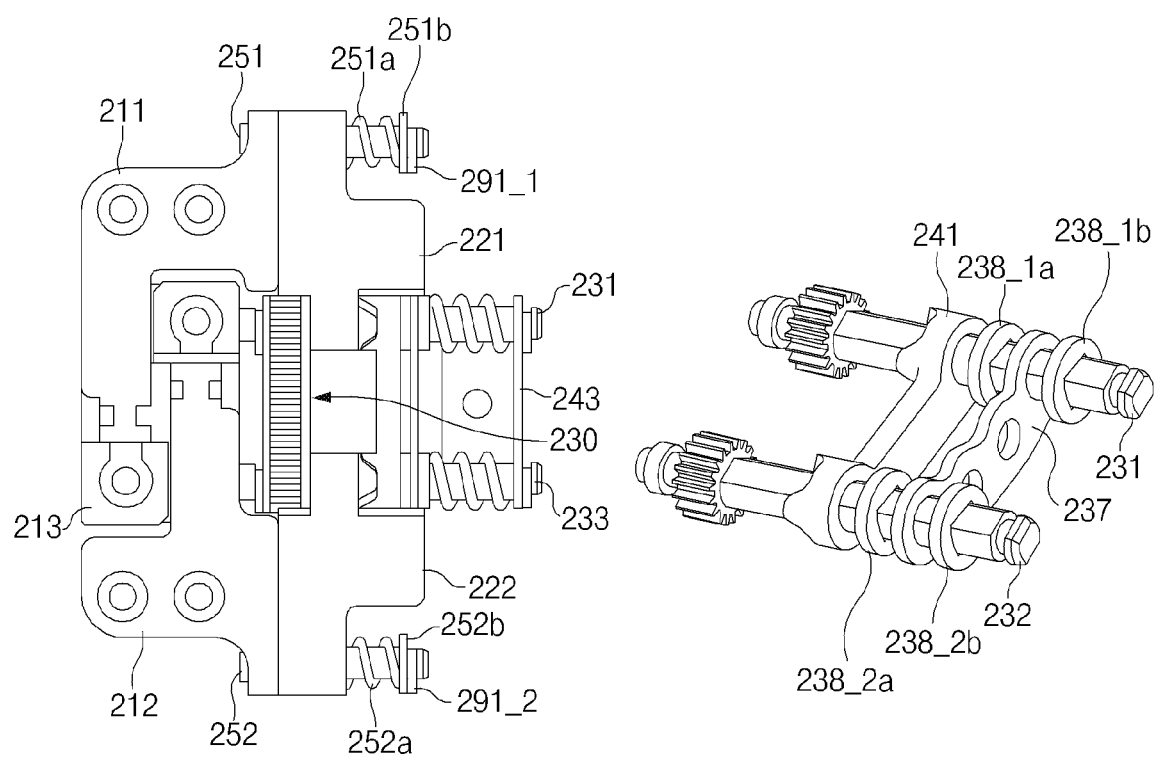
FIG. 11 illustrates a view of an additional structure of the first hinge structure according to various embodiments.

FIG. 11 illustrates a view of an additional structure of the first hinge structure according to various embodiments.

Referring to FIG. 11, the first hinge structure 200a (or the second hinge structure 200b) may include the fixed bracket 213, the first rotary bracket 211, the second rotary bracket 212, the first arm 221, the second arm 222, the first fixing part 251, the second fixing part 252, the first rotary member 231, the second rotary member 232, the gear structure 230 including the shaft gears of the first rotary member 231 and the second rotary member 232 and the idle gears, the cam part 241, the first elastic body 242a, the second elastic body 242b, and the support bracket 243. Additionally or alternatively, at least one washer ring and a ring plate 237 may be further added.

The at least washer ring may include, for example, a first washer ring 238_1a and a second washer ring 238_1b that are mounted on the first rotary member 231. The first washer ring 238_1a may be disposed between the cam part 241, one side of which is mounted on the first rotary member 231, and the ring plate 237. The second washer ring 238_1b may be disposed between the ring plate 237 and the first elastic body 242a.

According to an embodiment, the at least washer ring may include, for example, a third washer ring 238_2a and a fourth washer ring 238_2b that are mounted on the second rotary member 232. The third washer ring 238_2a may be disposed between the cam part 241, an opposite side of which is mounted on the second rotary member 232, and the ring plate 237. The fourth washer ring 238_2b may be disposed between the ring plate 237 and the second elastic body 242b.

The ring plate 237 may include a guide hole into which the first rotary member 231 is inserted and a guide hole into which the second rotary member 232 is inserted. The ring plate 237 may be disposed between the first washer ring 238_1a and the second washer ring 238_1b and between the third washer ring 238_2a and the fourth washer ring 238_2b. The ring plate 237 may serve as a support part during generation of frictional forces of the washer rings 238_1a, 238_1b, 238_2a, and 238_2b and may provide frictional force to enable the first hinge structure 200a to be mounted at various angles of the first rotary member 231 and the second rotary member 232 by the washer rings 238_1a, 238_1b, 238_2a, and 238_2b.

According to various embodiments, a third elastic body 251a and a fifth washer ring 251b may be additionally mounted on the first fixing part 251, and the first fixing clip 291_1 for fixing the first fixing part 251 to the first arm 221 may be disposed. The fifth washer ring 251b may be disposed between the third elastic body 251a and the first fixing clip 291_1. The third elastic body 251a may serve to more firmly bring one end (e.g., the first connecting part 221_2) of the first arm 221 into contact with one end (e.g., the first slide hole 211_2) of the first rotary bracket 211. The fifth washer ring 251b may increase frictional force in the contact process between the first rotary bracket 211 and the first arm 221, thereby enabling the first hinge structure 200a to be mounted at various angles. Similarly to the above-described structure, the second fixing part 252 may additionally include a fourth elastic body 252a and a sixth washer ring 252b, and the second fixing clip 291_2 for fixing the second fixing part 252 may be disposed on one side of the second arm 222.

According to various embodiments, a hinge structure 200 may include a first rotary bracket 211 that rotates about a first virtual axis 11 within a first range, a second rotary bracket 212 that rotates about a second virtual axis 12 within a second range, a fixed bracket 213 having the first rotary bracket and the second rotary bracket fixed thereto, a first rotary member that rotates about a first axis of rotation different from the first virtual axis, a second rotary member that rotates about a second axis of rotation different from the second virtual axis, a first arm 221 including a first basic body 221_1, a first connecting part 221_2 disposed on one side of the first basic body and connected with the first rotary bracket, a first insertion part 221_3 having one side mounted on the first rotary member, and a first rotary cam 221_4 disposed adjacent to the first insertion part, a second arm 222 including a second basic body 222_1, a second connecting part 222_2 disposed on one side of the second basic body and connected with the second rotary bracket, a second insertion part 222_3 having one side mounted on the second rotary member 232, and a second rotary cam 222_4 disposed adjacent to the second insertion part, a cam part 241 having bumpy structures corresponding to the first rotary cam and the second rotary cam, a first elastic body 242a that is mounted on the first rotary member and that supports at least one side of the cam part in a direction toward the first arm, a second elastic body 242b that is mounted on the second rotary member and that supports at least an opposite side of the cam part in a direction toward the second arm, and a support bracket 243 that supports the first elastic body and the second elastic body.

According to various embodiments, the first rotary bracket may rotate in a direction from the center of the fixed bracket to the outside thereof while being changed from a horizontal state to a vertical state, the first rotary bracket may rotate in a direction from the outside of the fixed bracket to the center thereof while being changed from the vertical state to the horizontal state, and the second rotary bracket may simultaneously rotate in an opposite direction while the first rotary bracket rotates.

According to various embodiments, a first fixing part that fixes the first arm may move in a direction from an outer portion of a first slide hole to an inner portion thereof while the first rotary bracket is changed from a horizontal state to a vertical state, the first fixing part that fixes the first arm may move in a direction from the inner portion of the first slide hole to the outer portion thereof while the first rotary bracket is changed from the vertical state to the horizontal state, and a second fixing part may operate in the same manner as the first fixing part.

According to various embodiments, the hinge structure may further include at least one of a first fixing clip 291_1 that is disposed at an end of a first fixing part and that fixes the first fixing part to the first arm and a second fixing clip 291_2 that is disposed at an end of a second fixing part and that fixes the second fixing part to the second arm.

According to various embodiments, the first rotary member may include a first insertion part 231_3 mounted on one side of the fixed bracket, a first shaft body 231_1 fixed to one side of the support bracket, and a first shaft gear 231_2 disposed between the first insertion part and the first shaft body, and the second rotary member may include a second insertion part 232_3 mounted on the one side of the fixed bracket, a second shaft body 232_1 fixed to the one side of the support bracket, and a second shaft gear 232_2 disposed between the second insertion part and the second shaft body.

According to various embodiments, the hinge structure may further include a first idle gear 233 engaged with the first shaft gear and a second idle gear 234 engaged with the first idle gear and the second shaft gear.

According to various embodiments, the hinge structure may further include a support plate 235 that includes guide holes into which the first insertion part and the second insertion part are inserted and that fixes one side of the first idle gear and one side of the second idle gear.

According to various embodiments, the hinge structure may further include at least one of a third fixing clip 292_1 disposed at an end of the first insertion part to prevent the first insertion part from being separated from the support plate and a fourth fixing clip 292_2 disposed at an end of the second insertion part to prevent the second insertion part from being separated from the support plate.

According to various embodiments, the hinge structure may further include a stopper 236 that is mounted on one side of the first rotary member and one side of the second rotary member and that faces one side of the first insertion part and one side of the second insertion part to prevent the first arm and the second arm from rotating through a specified angle or more.

According to various embodiments, the hinge structure may further include a fifth fixing clip 249_1 disposed at an end of the first rotary member to prevent the first rotary member from being separated from the support bracket and a sixth fixing clip 249_2 disposed at an end of the second rotary member to prevent the second rotary member from being separated from the support bracket.

According to various embodiments, the first virtual axis and the second virtual axis may be formed between the first rotary member and the second rotary member.

According to various embodiments, the first virtual axis and the second virtual axis may be formed at a specified height above the first rotary member and the second rotary member.

According to various embodiments, the hinge structure may further include at least one of a ring plate 237 disposed between the cam part and the first elastic body or the second elastic body, a first washer ring 238_1a disposed between the cam part and the ring plate and mounted on the first rotary member, and a second washer ring 238_2a disposed between the cam part and the ring plate and mounted on the second rotary member.

According to various embodiments, the hinge structure may further include at least one of a third washer ring 238_1b disposed between the ring plate and the first elastic body and mounted on the first rotary member and a fourth washer ring 238_2b disposed between the ring plate and the second elastic body and mounted on the second rotary member.

According to various embodiments, top portions of ridges 222_4a of the first rotary cam or the second rotary cam may include a flat area having a specified width, and bottom portions of valleys 222_4b of the first rotary cam or the second rotary cam may include a flat area having a specified width.

According to various embodiments, the hinge structure may further include at least one of a third elastic body 251a disposed between the first fixing part and the first fixing clip and a fourth elastic body 252a disposed between the second fixing part and the second fixing clip.

According to various embodiments, the hinge structure may further include at least one of a fifth washer ring 251b disposed between the third elastic body and the first fixing clip and a sixth washer ring 252b disposed between the fourth elastic body and the second fixing clip.

According to various embodiments, the first rotary member 231 and the second rotary member 232 may be mounted on one side of the fixed bracket so as to be spaced apart from each other at a predetermined interval.

According to various embodiments, the hinge structure may further include a first fixing part 251 that is fixed to the first connecting part 221_2 through a first slide hole 211_2 formed on one side of the first rotary bracket and that slides along the first slide hole and a second fixing part 252 that is fixed to the second connecting part 222_2 through a second slide hole 212_2 formed on one side of the second rotary bracket and that slides along the second slide hole.

According to various embodiments, an electronic device may include a first housing 110, a second housing 120, a hinge structure 200 that connects the first housing and the second housing and supports hinge motion of the first housing or the second housing, a hinge housing 150 that surrounds the hinge structure, and a display 160 disposed on the first housing and the second housing. At least the upper portion 161 or the lower portion 162 of the flexible display may be attached to at least part of an upper side of the first housing or an upper side of the second housing, and at least part of a central portion 163 of the flexible display is disposed to have a specified gap from the hinge structure. The hinge structure may include a first rotary bracket that is coupled with the first housing and that rotates about a first virtual axis within a first range, a second rotary bracket that is coupled with the second housing and that rotates about a second virtual axis within a second range, a fixed bracket having the first rotary bracket and the second rotary bracket fixed thereto, a first arm that is connected with the first rotary bracket on one side thereof and that has a first rotary cam formed on an opposite side thereof, a second arm that is connected with the second rotary bracket on one side thereof and that has a second rotary cam formed on an opposite side thereof, and a cam part having bumpy structures corresponding to the first rotary cam and the second rotary cam.

According to various embodiments, a first fixing part that fixes the first arm may move in a direction from an outer portion of a first slide hole to an inner portion thereof while the first rotary bracket is changed from a horizontal state to a vertical state, the first fixing part that fixes the first arm may move in a direction from the inner portion of the first slide hole to the outer portion thereof while the first rotary bracket is changed from the vertical state to the horizontal state, and a second fixing part may operate in the same manner as the first fixing part.

Figure 12:
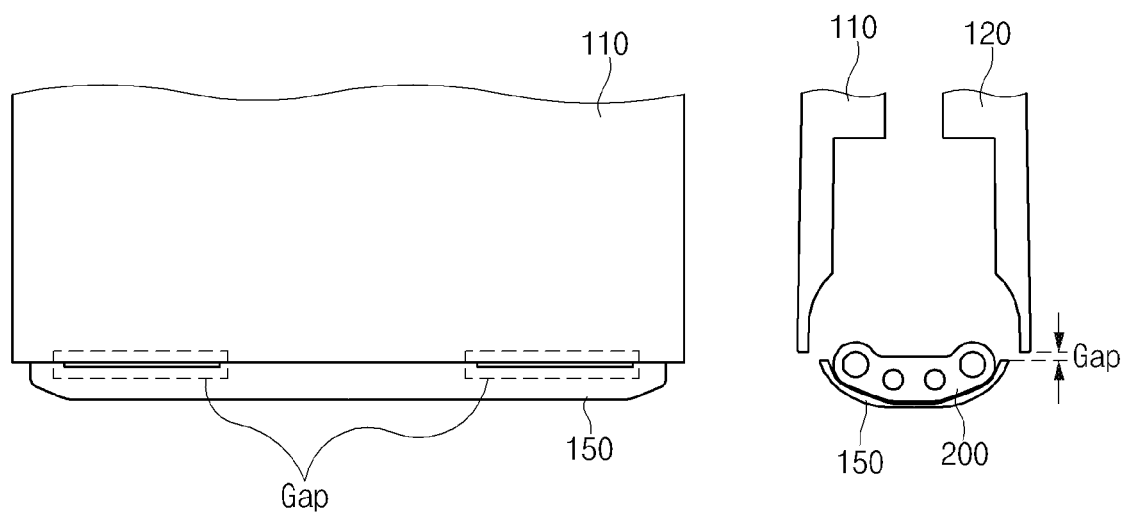
FIG. 12 illustrates a view of one example of a folded state of the electronic device according to an embodiment.

FIG. 12 illustrates a view of one example of a folded state of the electronic device according to an embodiment.

Referring to FIG. 12, when the first housing 110 and the second housing 120 of the electronic device 100 are in the folded state, a gap Gap_2, as illustrated, may be formed in the area where the hinge housing 150 is coupled with the first housing 110 or the second housing 120. The gap Gap_2 may be caused by the height of a sidewall of the hinge housing 150, and when the hinge structures 200 are in the folded state, the gap Gap_2 of the hinge housing 150 may be observed from the outside. The gap Gap_2 may be formed to prevent the hinge housing 150 from hindering hinge motions of the hinge structures 200 while the hinge structures 200 are folded or unfolded. Accordingly, when the electronic device 100 is in the folded state, the gap Gap_2 may be observed between the hinge housing 150 and the hinge structures 200. The observation of the gap Gap_2 may be a factor that reduces the completeness of the electronic device 100 in appearance. For example, a part of the hinge structures 200 disposed inside may be observed from the outside through the gap Gap_2.

Figure 13:
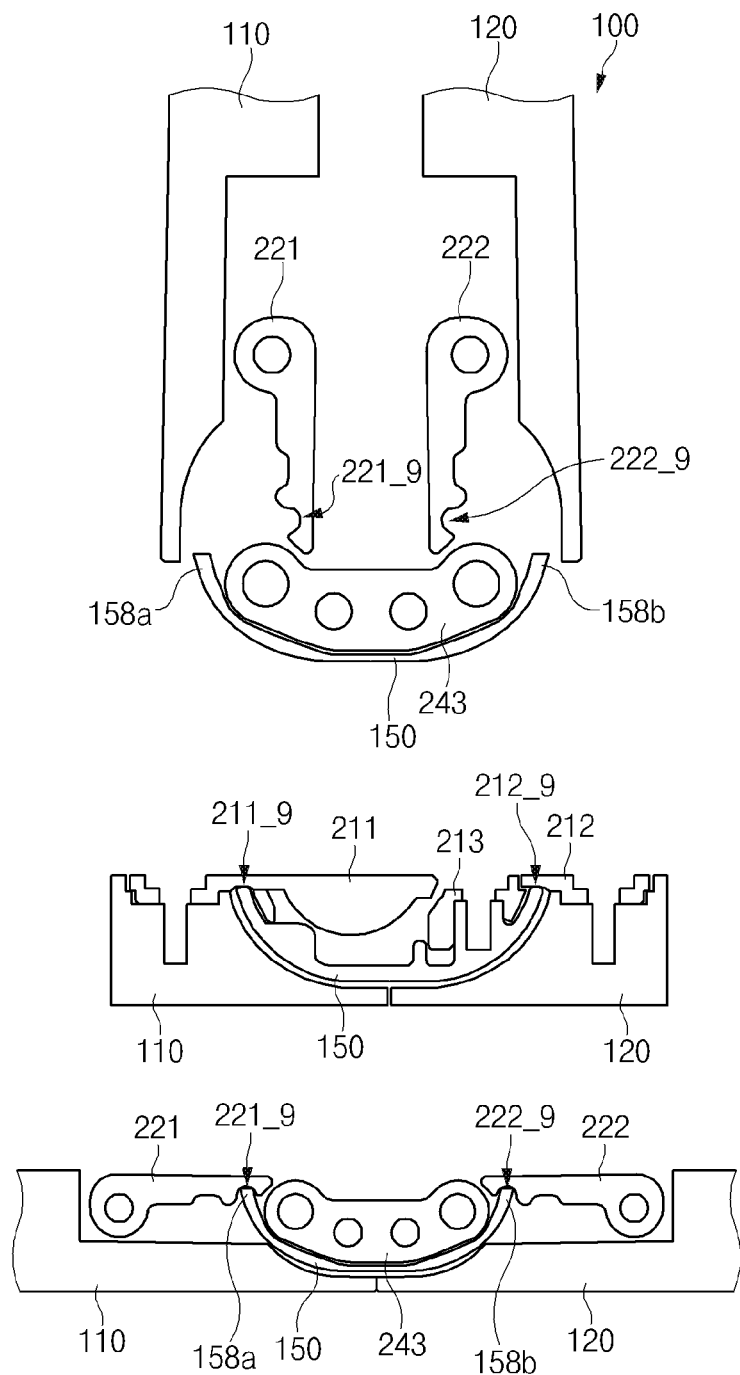
FIG. 13 illustrates a view of another example of a folded state of the electronic device according to an embodiment.

FIG. 13 illustrates a view of another example of a folded state of the electronic device according to an embodiment.

Referring to FIG. 13, ends of lateral portions 158a and 158b of the hinge housing 150 may be formed in higher positions than ends of the first housing 110 and the second housing 120 by a specified height in the direction of the vertical axis 803 when the first housing 110 and the second housing 120 are in the folded state. Accordingly, when the electronic device 100 is in the folded state, only the hinge housing 150 may be observed from the outside, and no separate gaps may be observed at the boundaries between the hinge housing 150 and the housings 110 and 120. In this regard, as the ends of the lateral portions 158a and 158b of the hinge housing 150 are formed in higher positions than the ends of the first housing 110 and the second housing 120 by the specified height in the direction of the vertical axis 803, first and second receiving grooves 221_9 and 222_9 may be disposed on predetermined areas of the first arm 221 and the second arm 222 to prevent a collision with the first arm 221 and the second arm 222. The first and second receiving grooves 221_9 and 222_9 may include, for example, the first receiving groove 221_9 disposed at an end of the first arm 221 and the second receiving groove 222_9 disposed at an end of the second arm 222. When the electronic device 100 is in a flat state, the first lateral portion 158a of the hinge housing 150 may be received in the first receiving groove 221_9, and the second lateral portion 158b of the hinge housing 150 may be received in the second receiving groove 222_9.

According to various embodiments, as the ends of the lateral portions 158a and 158b of the hinge housing 150 are formed in higher positions than the ends of the first housing 110 and the second housing 120 by the specified height in the direction of the vertical axis 803, third and fourth receiving grooves 211_9 and 212_9 may be disposed on the first rotary bracket 211 and the second rotary bracket 212. The third receiving groove 211_9 may be formed on a central portion of the first rotary bracket 211 (e.g., between the first rail 211_3 and the first housing coupling holes 211_4 illustrated in FIG. 4). Similarly, the fourth receiving groove 212_9 may be formed on a central portion of the second rotary bracket 212 (e.g., between the second rail 212_3 and the second housing coupling hole 212_4 illustrated in FIG. 4). When the electronic device 100 is in the flat state, the first lateral portion 158a may be received in the third receiving groove 211_9, and the second lateral portion 158b may be received in the fourth receiving groove 212_9.

In accordance with the use of the structure described above, the heights of the lateral portions 158a and 158b of the hinge housing 150 in the direction of the vertical axis 803 may be greater than the depths of the first housing 110 and the second housing 120 in the opposite direction to the direction of the vertical axis 803. For example, when the electronic device 100 is in the folded state, the first lateral portion 158a may be located inside the first housing 110 and may be disposed in a higher position than the lower end of the first housing 110, and when viewed in the direction of the horizontal axis 801, at least part of the first lateral portion 158a may overlap the end of the first housing 110. Similarly, when the electronic device 100 is in the folded state, the second lateral portion 158b may be located inside the second housing 120 and may be disposed in a higher position than the lower end of the second housing 120, and when viewed in the direction of the horizontal axis 801, at least part of the second lateral portion 158b may overlap the end of the second housing 120.

Figure 14:
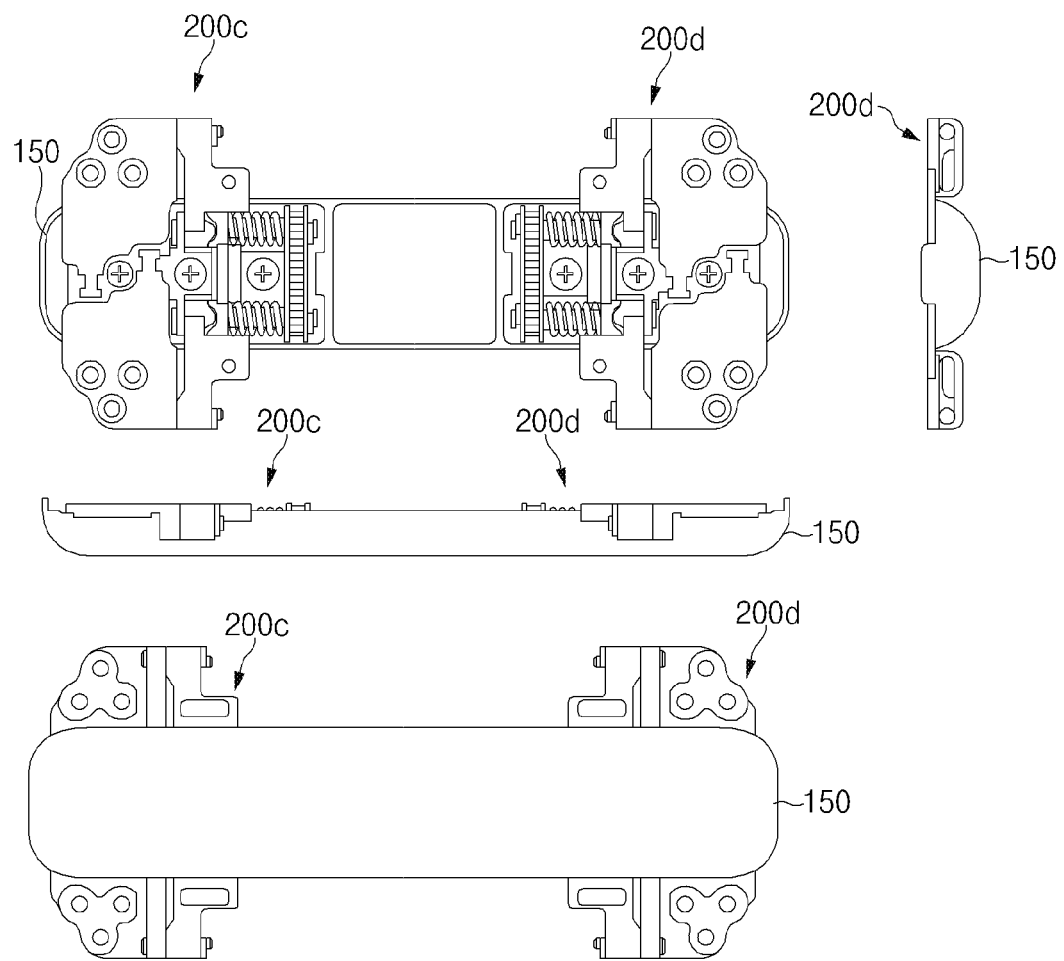
FIG. 14 illustrates a view of a hinge housing and hinge structures according to various embodiments.
Figure 15:
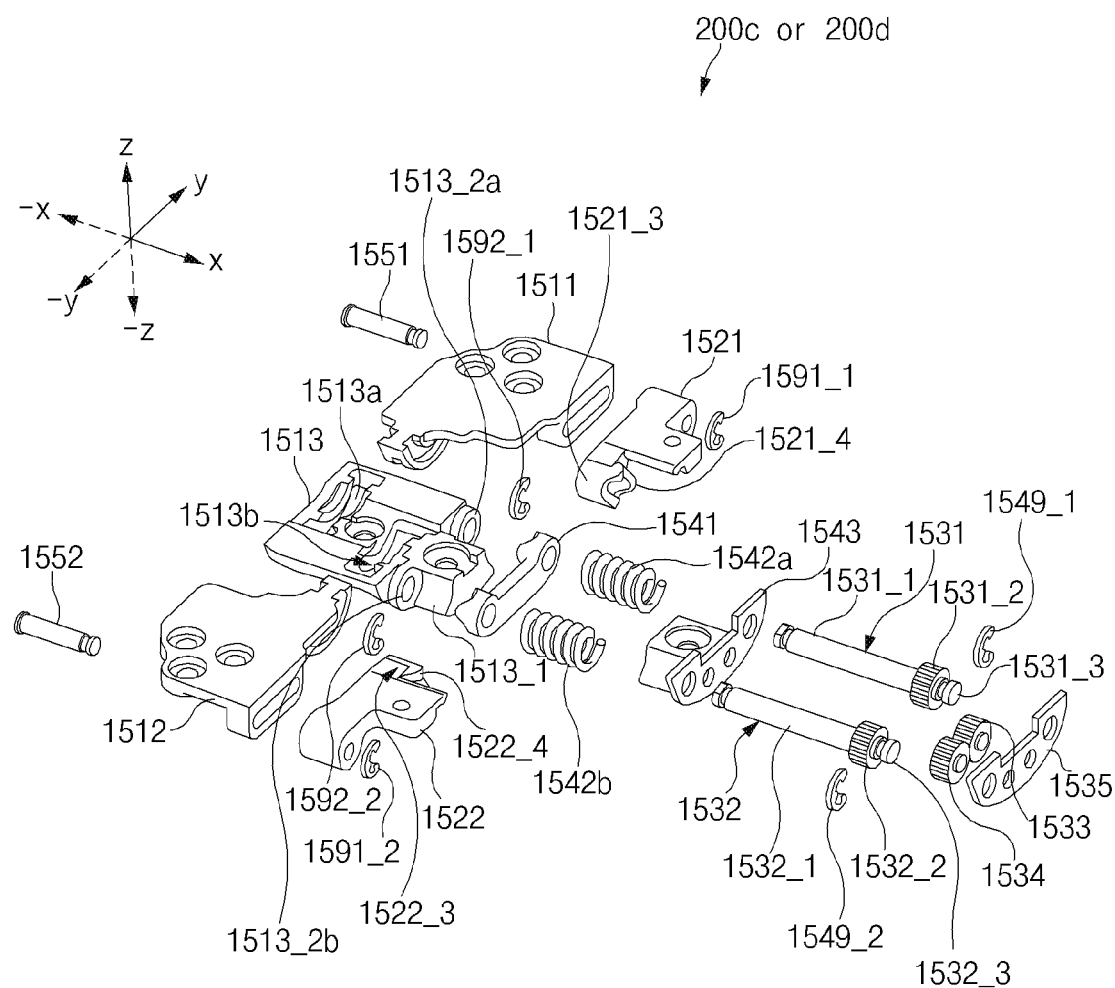
FIG. 15 illustrates an exploded perspective view of the hinge structure illustrated in FIG. 14.

FIG. 14 illustrates a view of a hinge housing and hinge structures according to various embodiments, and FIG. 15 illustrates an exploded perspective view of the hinge structure illustrated in FIG. 14.

Referring to FIGS. 14 and 15, according to an embodiment, a third hinge structure 200c and a fourth hinge structure 200d may be disposed on a hinge housing 150.

The third hinge structure 200c may be disposed on one side of the hinge housing 150 (e.g., on a left side with respect to the illustrated drawing). The third hinge structure 200c may be coupled with a left side of a first housing 110 (e.g., the first housing 110 of FIG. 1A) and a left side of a second housing 120 (e.g., the second housing 120 of FIG. 1A) and may rotate about a horizontal axis of the hinge housing 150 within a specified range. The third hinge structure 200c may be disposed to be symmetric to the fourth hinge structure 200d with respect to a central portion of the hinge housing 150.

The fourth hinge structure 200d may be disposed on an opposite side of the hinge housing 150 (e.g., on a right side with respect to the illustrated drawing). The fourth hinge structure 200d may be coupled with a right side of the first housing 110 (e.g., the first housing 110 of FIG. 1A) and a right side of the second housing 120 (e.g., the second housing 120 of FIG. 1A) and may rotate about the horizontal axis of the hinge housing 150 within the specified range. The fourth hinge structure 200d may be disposed to be symmetric to the third hinge structure 200c with respect to the central portion of the hinge housing 150. The fourth hinge structure 200d may include the same structure and configuration as the third hinge structure 200c. However, the position of the fourth hinge structure 200d may differ from the position of the third hinge structure 200c.

The hinge housing 150 may have a semi-cylindrical shape with an empty space inside, or may have the shape of a longitudinal half of a pipe with opposite ends closed. The hinge housing 150 may have the same structure as the hinge housing described above with reference to FIG. 2 and may be formed of the same material as that of the hinge housing described above with reference to FIG. 2.

The third hinge structure 200c (or the fourth hinge structure 200d) may include a fixed bracket 1513, a first rotary bracket 1511, a second rotary bracket 1512, a first fixing part 1551, a second fixing part 1552, a first arm 1521, a second arm 1522, a first rotary member 1531, a second rotary member 1532, a cam part 1541, a first elastic body 1542a, a second elastic body 1542b, a support bracket 1543, a first idle gear 1533, a second idle gear 1534, a support plate 1535, and a plurality of fixing clips 1591_1, 1591_2, 1592_1, 1592_2, 1549_1, and 1549_2. At least some of the aforementioned components of the third hinge structure 200c (or the fourth hinge structure 200d) may be formed of a metallic material to have a predetermined stiffness. Alternatively, the third hinge structure 200c (or the fourth hinge structure 200d) may contain a material, such as reinforced plastic or resin, as needed.

At least part of the shape of a lower surface (e.g., a surface facing the −z-axis direction) of the fixed bracket 1513 may include a curved surface. For example, the lower surface of the fixed bracket 1513 may be formed to correspond to the shape of the inside of the hinge housing 150. An upper surface (e.g., a surface facing the z-axis direction) of the fixed bracket 1513 may have a flat shape, and rails grooves 1513a and 1513b to which the rotary brackets 1511 and 1512 are coupled may be formed on the upper surface of the fixed bracket 1513. The rail grooves 1513a and 1513b may have the same shape and arrangement as the rail grooves 213a and 213b described above with reference to FIG. 4. Accordingly, the first rotary bracket 1511 and the second rotary bracket 1512 that are inserted into the rail grooves 1513a and 1513b may rotate in the same manner as the first rotary bracket 211 and the second rotary bracket 212 described above with reference to FIG. 4.

According to various embodiments, the fixed bracket 1513 may include a protrusion 1513_1 that protrudes in the third direction (e.g., the x-axis direction), and at least parts of opposite sides (e.g., a side facing the y-axis direction and a side facing the −y-axis direction) of the protrusion 1513_1 may be formed to be curved surfaces. At least part of the first arm 1521 and at least part of the cam part 1541 may be mounted on one side of the protrusion 1513_1, and at least part of the second arm 1522 and at least part of the cam part 1541 may be mounted on an opposite side of the protrusion 1513_1. A first mounting recess 1513_2a and a second mounting recess 1513_2b may be disposed on lateral portions of the fixed bracket 1513 that face the third direction (e.g., the x-axis direction) and that are disposed on opposite sides of the protrusion 1513_1. One side of the first rotary member 1531 and one side of the second rotary member 1532 may be mounted in the first mounting recess 1513_2a and the second mounting recess 1513_2b, respectively. Alternatively, one side of the first rotary member 1531 that passes through one side of the support bracket 1543, the first elastic body 1542a, and the cam part 1541 may be mounted in the first mounting recess 1513_2a, and one side of the second rotary member 1532 that passes through an opposite side of the support bracket 1543, the second elastic body 1542b, and the cam part 1541 may be mounted in the second mounting recess 1513_2b.

The structures of the first rotary bracket 1511 and the second rotary bracket 1512 may be the same as, or similar to, the structures of the first rotary bracket 211 and the second rotary bracket 212 described above with reference to FIG. 4. Additionally or alternatively, bracket bodies of the first rotary bracket 1511 and the second rotary bracket 1512 may be formed to be wider than the first bracket body 211_1 and the second bracket body 212_1 described above with reference to FIG. 4.

The first fixing part 1551 may have a pin shape with a predetermined length in one direction. The first fixing part 1551 may pass through at least a slide hole of the first rotary bracket 1511 and may be mounted in a connecting part of the first arm 1521 and fixed in the third direction (e.g., the x-axis direction) by the first fixing clip 1591_1. One side of the first fixing part 1551 may slide in the slide hole of the first rotary bracket 1511 in the y-axis direction or the −y-axis direction.

The second fixing part 1552 may have substantially the same shape as the first fixing part 1551. The second fixing part 1552 may be disposed to be symmetric to the first fixing part 1551 with respect to the fixed bracket 1513, and at least part of the second fixing part 1552 may be fixedly inserted into a slide hole of the second rotary bracket 1512 and a connecting part of the second arm 1522 in the third direction (e.g., the x-axis direction). One side of the second fixing part 1552 may slide in the slide hole of the second rotary bracket 1512 in the y-axis direction or the −y-axis direction.

The first arm 1521 may be fastened with the first rotary bracket 1511 through the first fixing part 1551 and may rotate within a specified angle range in conjunction with the first rotary bracket 1511 during hinge motion. According to an embodiment, the first arm 1521 may include a first insertion part 1521_3 and a first rotary cam 1521_4 and may include, as described above with reference to FIG. 4, components that correspond to the first basic body 221_1 and the first connecting part 221_2.

The first rotary cam 1521_4 may include at least one ridge and valley disposed in the direction in which the first rotary member 1531 is inserted into and protrudes from the first insertion part 1521_3. According to an embodiment, the ridge and the valley may include, at an end thereof, a flat area with a predetermined length. The first rotary cam 1521_4 and at least part of the first insertion part 1521_3 may be mounted on the one side of the protrusion 1513_1 of the fixed bracket 1513.

The second arm 1522 may have substantially the same configuration as the first arm 1521. For example, the second arm 1522 may include a second insertion part 1522_3 and a second rotary cam 1522_4. The second rotary member 1532 may be inserted into the second insertion part 1522_3, and the second rotary cam 1522_4 may be disposed to be engaged with an opposite side of the cam part 1541.

One end of the first rotary member 1531 that passes through the support bracket 1543, the first elastic body 1542a, one side of the cam part 1541, and the first insertion part 1521_3 may be mounted in the first mounting recess 1513_2a formed on the fixed bracket 1513. One side of the first rotary member 1531 may be fixed by the third fixing clip 1592_1, and an opposite side of the first rotary member 1531 may be engaged with the first idle gear 1533 and may be fixed to the support plate 1535 through the fifth fixing clip 1549_1. The first rotary member 1531 may include a first shaft body 1531_1, a first shaft gear 1531_2, and a first mounting part 1531_3.

The first shaft body 1531_1 may be disposed to pass through one side of the support bracket 1543, the first elastic body 1542a, the first insertion part 1521_3, the first rotary cam 1521_4, and one side of the cam part 1541 in the fourth direction (e.g., the −x-axis direction) from the third direction (e.g., the x-axis direction). The first shaft gear 1531_2 may be disposed on the first shaft body 1531_1 so as to be biased in the third direction (e.g., the x-axis direction). The first shaft gear 1531_2 may be disposed to be engaged with the first idle gear 1533.

The first mounting part 1531_3 may be formed to protrude from a surface of the first shaft gear 1531_2 that faces the third direction (e.g., a surface facing the x-axis direction). At least part of the first mounting part 1531_3 may pass through a guide hole formed in the support plate 1535, and the first mounting part 1531_3 may be fixed to the support plate 1535 through the fifth fixing clip 1549_1 to prevent separation or torsion of the first shaft body 1531_1.

One end of the second rotary member 1532 that passes through the support bracket 1543, the second elastic body 1542b, one side of the cam part 1541, and the second insertion part 1522_3 may be mounted in the second mounting recess 1513_2b formed on the fixed bracket 1513. One side of the second rotary member 1532 may be fixed by the fourth fixing clip 1592_2, and an opposite side of the second rotary member 1532 may be engaged with the second idle gear 1534 and may be fixed to the support plate 1535 through the sixth fixing clip 1549_2. The second rotary member 1532 may include a second shaft body 1532_1, a second shaft gear 1532_2, and a second mounting part 1532_3.

The second shaft body 1532_1 may have substantially the same shape and size as the first shaft body 1531_1. The second shaft body 1532_1 may be disposed in a position spaced apart from the first shaft body 1531_1 by a predetermined length. The second shaft gear 1532_2 may have the same shape and size as the first shaft gear 1531_2 and may be disposed on the second shaft body 1532_1. The position of the second shaft gear 1532_2 may be symmetric to the position of the first shaft gear 1531_2. At least part of the second mounting part 1532_3 may have the same shape and size as the first mounting part 1531_3. In this process, at least part of the second mounting part 1532_3 may pass through a guide hole of the support plate 1535 and may be fixed by the sixth fixing clip 1549_2.

The cam part 1541 may have the same structure and shape as the cam part 241 described above with reference to FIG. 4. The cam part 1541 may be disposed between the first and second arms 1521 and 1522 and the first and second elastic bodies 1542a and 1542b. At least part of the cam part 1541 may be mounted on at least part of the protrusion 1513_1 of the fixed bracket 1513.

The first elastic body 1542a may have a coil spring shape with an empty space inside. The first shaft body 1531_1 of the first rotary member 1531 that passes through the support bracket 1543 may be inserted into the first elastic body 1542a.

The shape and size of the second elastic body 1542b may be the same as, or similar to, the shape and size of the first elastic body 1542a. The second elastic body 1542b may have a coil spring shape with an empty space inside. The second shaft body 1532_1 of the second rotary member 1532 that passes through the support bracket 1543 may be inserted into the second elastic body 1542b.

The first elastic body 1542*a* and the second elastic body 1542*b* may be disposed between the cam part 1541 and the support bracket 1543 and may act to push the cam part 1541 in the fourth direction (e.g., the −x-axis direction) relative to the support bracket 1543 fixed to the hinge housing 150. The second elastic body 1542*b* may be disposed to be spaced apart from the first elastic body 1542*a* at a specified interval.

The support bracket 1543 may include a support part that supports at least part of the first elastic body 1542*a* and at least part of the second elastic body 1542*b*, guide holes through which the first shaft body 1531_1 of the first rotary member 1531 and the second shaft body 1532_1 of the second rotary member 1532 pass, and mounting recesses in which one side of the first idle gear 1533 and one side of the second idle gear 1534 are mounted.

The first idle gear 1533 may be disposed between the first shaft gear 1531_2 and the second shaft gear 1532_2 and may be engaged with the first shaft gear 1531_2 and the second idle gear 1534. The first idle gear 1533 may include a protrusion inserted into a guide hole formed in the support plate 1535 and may be fixed to a recess formed on the support bracket 1543 so as to be rotatable.

The second idle gear 1534 may be disposed between the first shaft gear 1531_2 and the second shaft gear 1532_2 and may be engaged with the first idle gear 1533 and the second shaft gear 1532_2. The second idle gear 1534 may be formed to have substantially the same shape and size as the first idle gear 1533. The second idle gear 1534 may include a protrusion inserted into a guide hole formed in the support plate 1535 and a protrusion inserted into a mounting recess formed on the support bracket 1543.

The support plate 1535 may be disposed to prevent separation of the rotary members 1531 and 1532 and the idle gears 1533 and 1534. In this regard, the support plate 1535 may include a plurality of guide holes. For example, the support plate 1535 may include a guide hole through which the first mounting part 1531_3 of the first rotary member 1531 passes, a guide hole through which the second mounting part 1532_3 of the second rotary member 1532 passes, and guide holes (or guide recesses) in which the protrusion of the first idle gear 1533 and the protrusion of the second idle gear 1534 are mounted.

The plurality of fixing clips 1591_1, 1591_2, 1592_1, 1592_2, 1549_1, and 1549_2 may fix one or more components included in the third hinge structure 200*c* (or the fourth hinge structure 200*d*) to prevent the components from being separated from the corresponding positions and may allow the corresponding components to rotate. The plurality of fixing clips 1591_1, 1591_2, 1592_1, 1592_2, 1549_1, and 1549_2 may include, for example, a C-clip. The plurality of fixing clips 1591_1, 1591_2, 1592_1, 1592_2, 1549_1, and 1549_2 may include, for example, the first fixing clip 1591_1 for fixing the first fixing part 1551 to a surface of the first arm 1521 that faces the third direction (e.g., a surface facing the x-axis direction), the second fixing clip 1591_2 for fixing the second fixing part 1552 to a surface of the second arm 1522 that faces the third direction (e.g., a surface facing the x-axis direction), the third fixing clip 1592_1 coupled with one end of the first shaft body 1531_1 of the first rotary member 1531 (e.g., an end on the opposite side to the point where the first mounting part 1531_3 is disposed), the fourth fixing clip 1592_2 coupled to one end of the second shaft body 1532_1 of the second rotary member 1532 (e.g., an end on the opposite side to the point where the second mounting part 1532_3 is disposed), the fifth fixing clip 1549_1 disposed to fix the first mounting part 1531_3 to a surface of the support plate 1535 that faces the third direction (e.g., a surface facing the x-axis direction), and the sixth fixing clip 1549_2 disposed to fix the second mounting part 1532_3 to the surface of the support plate 1535 that faces the third direction (e.g., the surface facing the x-axis direction).

In the above-described hinge structure (e.g., the third hinge structure 200*c* or the fourth hinge structure 200*d*) of the disclosure, the gear structure may be located a specified distance from the area where the rotary brackets and the fixed bracket are coupled.

An electronic device including a hinge structure according to an embodiment of the disclosure may include a first rotary member that rotates about a first axis, a second rotary member that rotates about a second axis, a first arm having a first connecting part, a second connecting part, and a first cam structure, the first connecting part being connected with the first rotary member, and the second connecting part being connected with the second rotary member, a second arm having a third connecting part, a fourth connecting part, and a second cam structure, a cam member including a first cam engaged with the first cam structure and a second cam engaged with the second cam structure, a first elastic body that is connected with the first rotary member and that applies elastic force to the cam member, a second elastic body that is connected with the second rotary member and that applies elastic force to the cam member, a first rotary bracket having a first slide hole and a first rail, a second rotary bracket having a second slide hole and a second rail, and a fixed bracket having a first guide groove corresponding to the first rail and a second guide groove corresponding to the second rail. The first slide hole of the first rotary bracket and the second connecting part may be connected through a first fixing part, and the second slide hole of the second rotary bracket and the fourth connecting part may be connected through a second fixing part. The first fixing part may slide in the first slide hole to correspond to rotation of the first arm, and the second fixing part may slide in the second slide hole to correspond to rotation of the second arm. The first rotary bracket may rotate about a third axis, and the second rotary bracket may rotate about a fourth axis.

According to various embodiments, the electronic device may further include a first housing and a second housing. The first housing may be connected with the first rotary bracket and may be rotated about the third axis, and the second housing may be connected with the second rotary bracket and may be rotated about the fourth axis.

According to various embodiments, the electronic device may further include a display placed on the first housing and the second housing, and the first axis and the second axis may be formed below the display when the electronic device is in a flat state.

According to various embodiments, the third axis and the fourth axis may be formed in higher positions in a direction toward the display than the first axis and the second axis.

According to various embodiments, an interval between the first axis and the second axis may be greater than an interval between the third axis and the fourth axis.

According to various embodiments, the electronic device may further include at least one washer ring disposed between the first rotary member and the first elastic body and between the second rotary member and the second elastic body.

According to various embodiments, the electronic device may further include at least one of a first washer ring coupled to an end of the first fixing part disposed to pass through the first connecting part and a second washer ring coupled to an end of the second fixing part disposed to pass through the second connecting part.

According to various embodiments, the electronic device may further include at least one of a first elastic member disposed between the end of the first fixing part and the first washer ring and a second elastic member disposed between the end of the second fixing part and the second washer ring.

According to various embodiments, the electronic device may further include a stopper disposed between the first rotary member and the second connecting part of the first arm and between the second rotary member and the fourth connecting part of the second arm to prevent the first arm and the second arm from rotating through a specified angle or more.

The hinge structures and the electronic devices including the same according to the various embodiments may provide various functions related to hinge motion in a relatively narrow arrangement area. For example, a hinge structure and an electronic device including the same according to an embodiment enable simultaneous rotary motions of a plurality of housings while providing a feeling of detent and supporting various mounting angles during hinge motions of the housings, thereby suppressing torsion of the housings during the rotary motions.

Various other aspects and effects provided by the hinge structures and the electronic devices including the same according to the various embodiments may be mentioned depending on the embodiments.

Each component (e.g., a module or a program module) according to various embodiments may be composed of single entity or a plurality of entities, a part of the above-described sub-components may be omitted, or other sub-components may be further included in various embodiments. Alternatively or additionally, after being integrated in one entity, some components (e.g., a module or a program module) may identically or similarly perform the function executed by each corresponding component before integration. According to various embodiments, operations executed by modules, program, or other components may be executed by a successive method, a parallel method, a repeated method, or a heuristic method, or at least one part of operations may be executed in different sequences or omitted. Alternatively, other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A portable communication device comprising:
    a housing including a first housing portion and a second housing portion;
    a hinge connected to the first housing portion and the second housing portion; and
    a flexible display disposed over the first housing portion, the hinge, and the second housing portion,
    wherein the hinge includes:
        a first gear coupled with a first shaft to rotate about a first axis of rotation;
        a second gear coupled with a second shaft to rotate about a second axis;
        a first arm coupled to the first housing portion, the first arm configured to rotate about the first axis and configured to rotate the first gear;
        a second arm coupled to the second housing portion, the second arm configured to rotate about the second axis and correspond to a rotation of the second gear;
        a first rotational member including a first rail configured to rotate about a third axis while the first arm is rotated about the first axis;
        a second rotational member including a second rail configured to rotate about a fourth axis while the second arm is rotated about the second axis;
        a first rotational cam configured to rotate with the first gear;
        a second rotational cam configured to rotate with the second gear;
        a first elastic member inserted to the first shaft;
        a second elastic member inserted to the second shaft;
        a first cam member engaged with the first rotational cam and configured to apply a first pressure or release the first pressure to the first elastic member based on rotation of the first rotation cam; and
        a second cam member engaged with the second rotational cam and configured to apply a second pressure or release the second pressure to the second elastic member based on rotation of the second rotation cam.

2. The portable communication device of claim 1, wherein
    a first shortest distance from the third axis to an upper surface of the flexible display is shorter than a second shortest distance from the first axis to the upper surface of the flexible display, in a state that a first portion and a second portion of the flexible display are unfolded to be coplanar with each other.

3. The portable communication device of claim 2, wherein the hinge further comprises:
    a support bracket configured to accommodate at least a portion of the first rotational member and at least a portion of the second rotational member.

4. The portable communication device of claim 3, wherein the support bracket includes a first guide groove corresponding to the first rail and a second guide groove corresponding to the second rail.

5. The portable communication device of claim 4, wherein the first housing portion is movably coupled to the first arm, and
    an elastic force of the first elastic member caused by the first pressure being applied by the first cam member configured to provide a detent operation during a rotation of the first housing portion with respect to the hinge.

6. The portable communication device of claim 4, wherein the
    first shaft is configured to engage a first idle gear via the first gear,
    wherein the second shaft is configured to engage a second idle gear via the second gear, and
    wherein the first idle gear is configured to engage the second idle gear.

7. The portable communication device of claim 4, wherein the
    first arm and the first rotational member are disposed symmetrically with the second arm and the second rotational member with respect to the support bracket.

8. The portable communication device of claim 1, further comprising:
    a hinge cover located under the hinge and forming a third portion of an exterior of the portable communication device.

9. The portable communication device of claim 8, wherein, when the housing is folded, a first ending portion of the hinge cover extended parallel with the first axis is accommodated in the first housing portion, such that the first ending portion is overlapped with a rear surface of the first housing portion when viewed in a first direction substantially perpendicular to the rear surface of the first housing portion, and wherein, when the housing is folded, a second ending portion of the hinge cover extended parallel with the second axis is accommodated in the second housing portion, such that the second ending portion is overlapped with a rear surface of the second housing portion when viewed in a second direction substantially perpendicular to the rear surface of the second housing portion.

10. The portable communication device of claim 8, wherein the at least a portion of the hinge cover, which is exposed when the flexible display is folded, is hidden by the first housing portion and the second housing portion when the flexible display is unfolded.

11. The portable communication device of claim 1, wherein a first distance between the third axis and the fourth axis is shorter than a second distance between the first axis and the second axis.

12. The portable communication device of claim 1, further comprising: the first gear configured to rotate with a rotation of the first arm; the second gear configured to rotate with a rotation of the second arm; a first idle gear disposed between the first gear and the second gear and configured to rotate with a rotation of the first gear; and a second idle gear disposed between the first de gear and the second gear and configured to rotate with a rotation of the second gear.

13. A portable communication device comprising:
a housing including a first housing portion and a second housing portion;
a flexible display accommodated in the first housing portion and the second housing portion; and
a hinge structure connected with the first housing portion and the second housing portion, the hinge structure including:
a first arm configured to rotate about a first axis of rotation and including a first connecting portion;
a second arm configured to rotate about a second axis of rotation and including a second connecting portion;
a fixed bracket disposed in proximity of the first arm and the second arm, and including a first curved guide groove and a second curved guide groove;
a first rotary bracket including a first sliding opening and a first curved rail formed therein, wherein the first connecting portion slides along the first sliding opening as the first arm rotates about the first axis, and the first rotary bracket connected with the fixed bracket such that the first rotary bracket rotates about a third axis by the first curved rail sliding along the first curved guide groove as the first arm rotates about the first axis; and
a second rotary bracket including a second sliding opening and a second curved rail formed therein, wherein the second connecting portion slides along the second sliding opening as the second arm rotates about the second axis, and the second rotary bracket connected with the fixed bracket such that the second rotary bracket rotates about a fourth axis by the second curved rail sliding along the second curved guide groove as the second arm rotates about the second axis,
wherein at least one display portion of the flexible display is configured to be bent as the first rotary bracket rotates about the third axis and the second rotary bracket rotates about the fourth axis.

14. The portable communication device of claim 13, wherein,
when viewed in a direction parallel with the first axis, a first portion of the first rotary bracket is intersected with a second portion of the second rotary bracket.

15. The portable communication device of claim 13, wherein the first housing portion is connected with the first rotary bracket and configured to rotate about the third axis as the first arm rotates about the first axis, and the second housing portion is connected with the second rotary bracket and configured to rotate about the fourth axis as the second arm rotates about the second axis.

16. The portable communication device of claim 15, wherein the third axis is located between the first axis and a first portion of the flexible display, and the fourth axis is located between the second axis and a second portion of the flexible display.

17. The portable communication device of claim 13, wherein a first distance between the first axis and the second axis is greater than a second distance between the third axis and the fourth axis.

18. The portable communication device of claim 13, wherein the first rotary bracket is configured to rotate in a first direction with respect to a center of the fixed bracket while a folding state of the housing is changed from an unfolded state to a folded state, and the second rotary bracket is configured to rotate in a second direction with respect to the center of the fixed bracket while the folding state of the housing is changed from the unfolded state to the folded state.

19. The portable communication device of claim 13, further comprising:
a first gear coupled with a first shaft to rotate about a first axis; and
a second gear coupled with a second shaft to rotate about a second axis.

20. The portable communication device of claim 19, further comprising:
a first idle gear and a second idle gear disposed between the first gear and the second gear.

21. The portable communication device of claim 20, wherein a first shortest distance from the third axis to an upper surface of the flexible display is shorter than a second shortest distance from the first axis to the upper surface of the flexible display, in a state that a first portion and a second portion of the flexible display are unfolded to be coplanar with each other.

22. The portable communication device of claim 19, wherein the first housing portion is movably coupled to the first arm, and
an elastic force of a first elastic member caused by a pressure being applied by a first cam member is configured to provide a detent operation during a rotation of the first housing portion with respect to the hinge structure.

* * * * *